US009449225B2

United States Patent
Ginosar et al.

(10) Patent No.: US 9,449,225 B2
(45) Date of Patent: Sep. 20, 2016

(54) LOW POWER HARDWARE ALGORITHMS AND ARCHITECTURES FOR SPIKE SORTING AND DETECTION

(75) Inventors: Ran Ginosar, Nofit (IL); Yevgeny Perelman, Haifa (IL); Alex Zviagintsev, Beer-Sheva (IL)

(73) Assignee: Technion Research & Development Authority, Haifa (IL)

( * ) Notice: Subject to any disclaimer, the term of this patent is extended or adjusted under 35 U.S.C. 154(b) by 2132 days.

(21) Appl. No.: 11/571,611

(22) PCT Filed: Jul. 6, 2005

(86) PCT No.: PCT/IL2005/000717
§ 371 (c)(1),
(2), (4) Date: Jan. 21, 2009

(87) PCT Pub. No.: WO2006/003662
PCT Pub. Date: Jan. 12, 2006

(65) Prior Publication Data
US 2009/0124919 A1    May 14, 2009

Related U.S. Application Data

(60) Provisional application No. 60/585,564, filed on Jul. 6, 2004.

(51) Int. Cl.
*A61B 5/02*    (2006.01)
*G06K 9/00*    (2006.01)

(52) U.S. Cl.
CPC ................. *G06K 9/00543* (2013.01)

(58) Field of Classification Search
CPC ........................ A61B 5/0476; A61B 5/0482
USPC .................................................. 600/544–545
See application file for complete search history.

(56) References Cited

U.S. PATENT DOCUMENTS 7,113,829 B2 *    9/2006    Lindberg et al. ............... 607/60
2001/0029391 A1 * 10/2001    Gluckman et al. ............... 607/2
(Continued)

OTHER PUBLICATIONS

"Evaluation of Spike-Detection Algorithms for a Brain-Machine Interface Application" by Iyad Obeid et al., IEEE Transactions on Biomedical Engineering, vol. 51, No. 6, Jun. 2004.*
(Continued)

*Primary Examiner* — Patricia Mallari
*Assistant Examiner* — Vasuda Ramachandran
(74) *Attorney, Agent, or Firm* — Roach Brown McCarthy & Gruber, P.C; Kevin D. McCarthy

(57) ABSTRACT

A neuronal recording system featuring a large number of electrodes and a portable wireless front-end integrated circuit for signal processing for low-power spike detection and alignment. The system is configured as a Neuroprocessor and introduces hardware architectures for automatic spike detection and alignment algorithms. The Neuroprocessor can be placed next to the recording electrodes and provide for all stages of spike processing, stimulating neuronal tissues and wireless communications to a host computer. Some of the algorithms are based on principal component analysis (PCA). Others employ a novel Integral Transform. The algorithms execute autonomously, but require off-line training and setting of computational parameters. Pre-recorded neuronal signals evaluate the accuracy of the proposed algorithms and architectures: The recorded data are processed by a standard PCA spike sorting software algorithm, as well as by the several hardware algorithms, and the outcomes are compared.

12 Claims, 30 Drawing Sheets

(56) References Cited

U.S. PATENT DOCUMENTS

| | | | |
|---|---|---|---|
| 2005/0113744 A1* | 5/2005 | Donoghue et al. | 604/66 |
| 2006/0049957 A1* | 3/2006 | Surgenor et al. | 340/825.19 |
| 2006/0165811 A1* | 7/2006 | Black et al. | 424/570 |

OTHER PUBLICATIONS

"Power Feasibility of Implantable Digital Spike-Sorting Circuits for Neural Prosthetic Systems" by Zumsteg et al., Proc. 26th Ann. Int. Conf. IEEE EMBS, Sep. 1-5, 2004.*

"Automatic Spike Sorting for Neural Decoding" by Wood et al., Proc. 26th Ann. Int. Conf. IEEE EMBS, Sep. 1-5, 2004.*

"The Shape of Neural Dependence" by Jenison et al., Sep. 16, 2003.*

Lewicki M. S., "A review of methods for spike sorting: the detection and classification of neural action potentials." Network: Comp. Neural Syst. 9(4): 53-78, 1998.

Schmidt E. "Computer separation of multi-unit neuroelectric data: A review". J Neurosc Meth.,. 12:95-11. 1984.

Harrison R., "A low-power integrated circuit for adaptive detection of action potentials in noisy signals," Proc. Inl. Conf. IEEE EMBS, 17-21, 2003.

Y. Perelman and R. Ginosar, "An Integrated System for Multichannel Neuronal Recording with Spike / LFP Separation and Digital Output," 2nd Int. IEEE EMBS Conf. Neural Eng., 377-380, 2005.

A. Zviagintsev et al., "A Low-Power Spike Detection and Alignment Algorithm," 2nd Int. IEEE EMBS Conf. Neural Eng., 317-320, 2005.

A. Zviagintsev et al., "Low-Power Architectures for Spike Sorting," 2nd Int. IEEE EMBS Conf. Neural Eng., 162-165, 2005.

Wheeler B.C. et al., "Automatic discrimination of single units," in Methods for Neural Ensemble Recordings, Ed Boca Raton, FL: CRC Press LLC, 1999.

Moxon K., et al. "Designing a brain-machine interface for neuroprosthetic control," in Neural Prostheses for Restoration of Sensory and Motor Function, J. K. Chapin and K. A. Moxon, Eds. Boca Raton, FL: CRC Press, 2001.

Obeid I., "Evaluation of Spike-Detection, Algorithms for a Brain-Machine Interface Application", IEEE Trans. Biomed. Eng., 51:905-911, 2004.

Guillory K. S. et al., "A 100-channel system for real time detection and storage of extracellular spike waveforms," J. Neurosci. Meth., 91:21-29, 1999.

H. Nakatani, et al., Detection of nerve action potentials under low signal-to-noise ratio condition, IEEE Trans. Blamed. Eng., 48:845-849, 2001.

K. Oweiss et al., "A multiresolution generalized maximum-likelihood approach for the detection of unknown transient multichannel signals in colored noise with unknown covariance," in Proc. ICASSP, 2993-2996, 2002.

Kim K. H. et al., "A Wavelet-Based Method for Action Potential Detection From Extracellular Neural Signal Recording With Low Signal-to-Noise Ratio," IEEE Tans. Biomed. Eng., 50:999-1011, 2003.

Chandra R., et al., "Detection, classification, and superposition resolution of action potentials in multiunit single channel recordings by an on-line real-time neural network," IEEE Trans. Biomed. Eng., 44: 403-412, 1997.

Nicoleilis M., "Actions from thoughts," Nature, 409:403-407, 2001.

Zumsteg et al., "Power Feasibility of Implantable Digital Spike-Sorting Circuits for Neural Prosthetic Systems," Proc. 26th Ann. Int. Conf. IEEE EMBS, 4237-4240, 2004.

Mead C., "Analog VLSI and Neural Systems," Addison-Wesley, 1989.

Alpha-Omega Engineering Ltd., Multi-Spike Detector (MSD).

Abeles M. et al., "Multispike train analysis," IEEE Trans. Biomed. Eng. 65:762-73, 1977.

Alpha-Omega Engineering Co., Ltd, Alpha Sort Ref. Manual, 1996-2002.

Eytan D., et al., "Selective Adaptation in Networks of Cortical Neurons," J. Neurosci. Methods. 23(28):9349-9356, 2003.

Chang, C. C. et al. (2001). LIBSVM: a library for support vector machines.

Worgotter F., et al., "An on-line spike form discriminator for extracellular recordings based on an analog correlation technique," J. Neurosci. Methods, 17:141-151, 1986.

Fee M.S., et al., "Automatic sorting of multiple-unit neuronal signals in the presence of anisotropic and non-gaussian variability," J. Neurosci. Methods, 69: 175-188, 1996.

D'Hollander E.H. et al., "A Spike recognition and on-line classification by an unsupervised learning system," IEEE Trans. Biomed. Eng. 26: 279-84, 1979.

Jansen R. F., "The reconstruction of individual spike trains from extracellular multineuron recording using a neural network emulation program," J. Neurosci, Methods, 35: 203-213, 1990.

Plexon Inc. http://www.plexoninc,.com/ofs.htm. Dallas, TX, 2003.

Shahaf G. et al., "Learning in networks of cortical neurons," J. Neurosci, Methods, 21(22): 8782-8788, 2001.

Mussa-Ivaldi F. A. et al., "Brain-machine interfaces: computational demands and clinical needs meet basic neuroscience," Trends Neurosc., 26: 6, 329-334, 2003.

Bar-Gad I., et al., "Failure in identification of multiple neuron activity causes artificial correlations." J. Neurosci, Methods., 107: 1-13, 2001.

Kim K. H. and Kim S. J., "Neural spike sorting under nearly 0 dB signal-to-noise ratio using nonlinear energy operator and artificial neural network classifier," IEEE Trans. Biomed. Eng. 47: 1406-1411, 2000.

Lu S. N., et al., "A Comparison of Unsupervised Automatic and Manual Cluster Analysis for Classifying Human Single Unit Data," Society for Neuroscience Meeting, 2003.

Sahani M.M., "Variable models for neural data analysis," Ph.D. dissertation, California Inst. Technol., Pasadena, CA, 1999.

Zouridakis G. et al., "Identification of reliable spike templates in multi-unit extracellular recordings using fuzzy clustering," Comp. Meth. Prog. Biomed. 61: 91-98, 2000.

Gesteland R. C., et al., "Comments on microelectrodes," Proc. IRE, vol. 47, pp. 1856-1862, 1959.

Vapnik V. N., Statistical learning Theory, NY John Wiley & Sons, 1988.

* cited by examiner

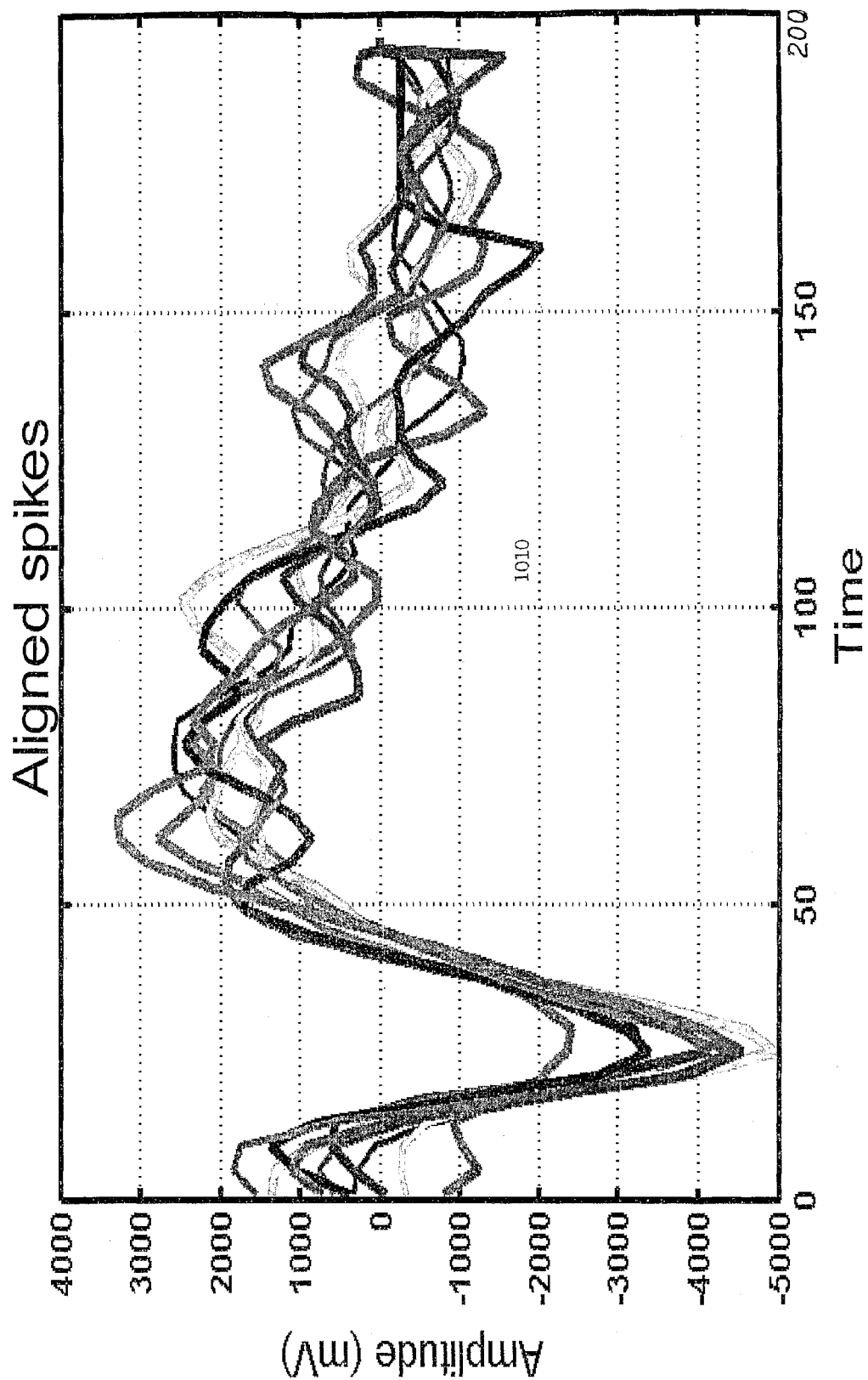

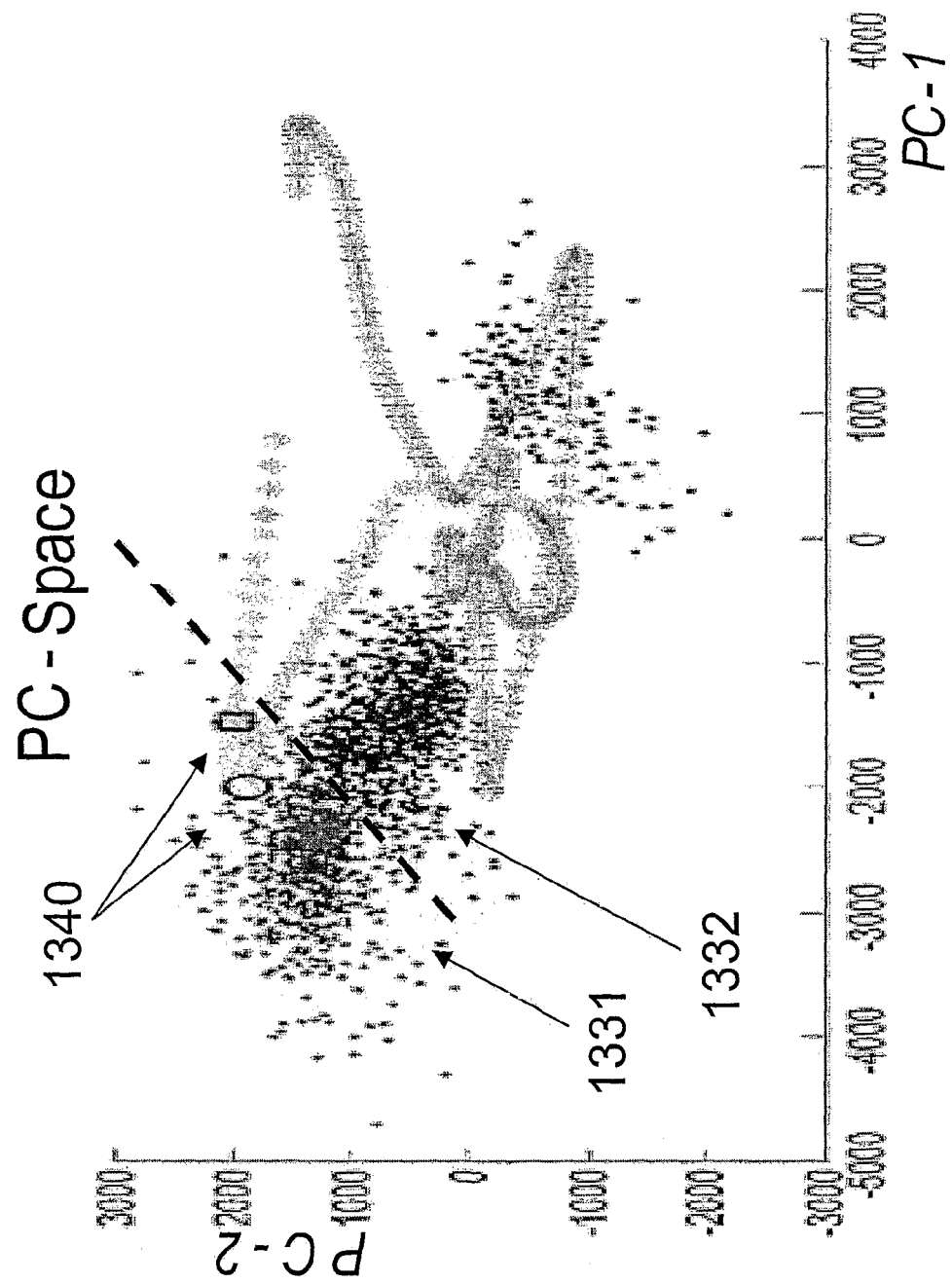

LOW POWER HARDWARE ALGORITHMS AND ARCHITECTURES FOR SPIKE SORTING AND DETECTION

CLAIM OF PRIORITY

This application is a national state entry of PCT/IL2005/000717 filed on Jul. 6, 2005; which claims priority from U.S. provisional patent application Ser. No. 60/585,564 filed on Jul. 6, 2004.

FIELD OF THE INVENTION

The present invention relates generally to systems for processing neuronal signals, and more particularly to a portable front-end integrated system and method for neuronal signal detection and sorting.

BACKGROUND OF THE INVENTION (For relevant technical literature, see the listing prior to the claims section).

Automatic and semiautomatic approaches to reconstruction and analysis of neuronal activity have been the subject of extensive research. A typical setup for a neuronal recording experiment in an animal or human subject requires high bandwidth communications between the recording electrodes and the processing computer, where spikes are detected and sorted. When a large number of recording electrodes is employed, typical transmission resources are insufficient and power-hungry. In addition, the large number of wires results in heavy cables, that severely constrain the subject. Consequently, it is desirable to pre-process and reduce the volume of the recorded data so that it can be transmitted wirelessly.

Investigation of implantable integrated circuits for power-efficient front-end processing of spikes is intended to minimize the communication bandwidth from the recording electrodes to the back-end computer. For instance, given a sampling rate of 24 Ksps and 12 bit sampling precision, the raw data rate is 288 Kbits/second per electrode. Spike detection and alignment (D&A) enables transmission of only active spike data and filters out the inter-spike noise. Assuming a high rate of 100 spikes/sec/electrode and 2 msec/spike, D&A reduces the data rate to 60 Kbits/sec. Spike sorting converts each spike to a short datagram (~20 bits), reducing the required data rate down to 2 Kbits/sec per electrode, less than 1% of the original rate.

The computational task of this data reduction for signals acquired by tens or hundreds of electrodes typically requires special purpose computing hardware: A conventional computer CPU would either be too large, or dissipate too much power for an implantable or portable device, or would be too slow for the job. The special purpose hardware must implement a custom-tailored architecture that is carefully tuned to perform the desired algorithm.

The most limiting constraint on implantable chips for spike detection of many electrodes is power dissipation. While exact prediction of power requirements without completely designing the circuits is elusive, the computational complexity of several D&A algorithms has been investigated as a reasonable predictor of their power. The other figure of merit for D&A is the accuracy of subsequent spike processing, which depends heavily on the quality of D&A. Several algorithms and architectures are considered that trade off some subsequent classification accuracy in return for significant savings in power. The most favorable architecture is shown to achieve 99% of the accuracy of a "standard" algorithm, while incurring only 0.05% of its computational complexity.

Electrophysiological study of brain structures using wire electrodes is one of the oldest methods in neuroscience. A single electrode can often pick up signals of multiple neurons from a small region around its tip. Separation and sorting of action potential waveforms ("spikes") originating from different neurons can be performed either on-line or off-line using various methods for pattern recognition. Off-line sorting is used for analysis of neural activity and also as a pre-requisite for on-line sorting. On-line sorting is used for closed loop experiments (in which stimulations are generated in response to detected spikes) and for clinical applications.

On-line sorting requires high bandwidth communications between the electrodes and the sorting computer, as well as high performance processing. When a large number of signals is to be handled, typical computing resources are insufficient. Special-purpose hardware for spike processing is called for high-volume research and clinical applications.

The prior art has demonstrated the feasibility of hardware implementation of two spike-sorting algorithms from a power consumption point of view. Yet, typical spike-sorting algorithms, such as based on Principal Component Analysis (PCA), are unattractive for efficient implementation in hardware, as they require storing and iterative processing of large amounts of data.

In typical neuronal recording experiments, the signals recorded by the electrodes are amplified and transmitted over wires to a host computer where they are digitized and processed according to the experimental requirements. The main disadvantage of that experimental arrangement is the need to connect a cable to the subject, restricting its movement.

SUMMARY OF THE INVENTION

Accordingly, it is a principal object of the present invention to overcome the disadvantages associated with the prior art and provide a neuronal spike processing system for detection, alignment and sorting of the spike data at the front-end. Front-end processing reduces the data bandwidth and enables wireless communication. Without such data reduction, large data volumes need to be transferred to a host computer and typically heavy cables are required which constrain the patient or test animal. The present invention discloses Neuroprocessor electronic chips for portable applications.

The Neuroprocessor can be placed next to the recording electrodes and provide for all stages of spike processing, stimulating neuronal tissues and wireless communication to a host computer. It dissipates a small amount of power, due to supply constraints and heat restrictions. Hardware architectures for automatic spike detection and alignment algorithms in Neuroprocessors described herein are designed for low power. Some of the algorithms are based on principal component analysis. Others employ a novel Integral Transform analysis and achieve 99% of the precision of a PCA detector, while requiring only 0.05% of the computational complexity.

The algorithms execute autonomously, but require off-line training and setting of computational parameters. Pre-recorded neuronal signals are employed to evaluate the accuracy of the proposed algorithms and architectures: The recorded data are processed by a standard PCA spike detection and alignment software algorithm, as well as by the several hardware algorithms, and the outcomes are compared.

According to a principal embodiment of the present invention, there is also provided a dedicated integrated circuit for spike sorting, the Neuroprocessor. If the Neuroprocessor is to be implanted in the brain, and/or used in portable applications (such as neuro-prosthetics), it should require minimal power for its operation.

The Neuroprocessor performs front-end analog processing, spike detection and analysis (D&A) and spike sorting, achieving significant data reduction and thus enabling wireless communications that replace cables and allow free movement of the patient or test subject.

It is a principal object of the present invention to provide spike sorting algorithms and architectures that minimize power consumption.

It is another principal object of the present invention to provide spike sorting algorithms that trade off some classification accuracy in return for significant savings in power.

The present invention provides five algorithms and architectures that achieve high precision spike sorting while minimizing power dissipation, and investigate their sorting errors, relative to a standard PCA software algorithm. All algorithms require off-line training for setting their computational parameters. Periodic re-training is typically required. The Hard Decision algorithm compares the spike signal with predetermined values. The Soft Decision algorithm applies filtering prior to making the comparisons. The Integral Transform algorithm applies linear signal separation in a predetermined integral transform space. The PCA sorting architecture implements common PCA with linear classification, and the Segmented PC algorithm applies PCA with reduced precision.

A wireless neuronal recording system is disclosed that includes a Neuroprocessor, electrodes, a wireless modem, and a power source. While it is feasible to transfer some raw signal recordings over the wireless channel, the larger volume of data collected by a large number of electrodes is prohibitive, and additional data reduction must be carried out by the Neuroprocessor. In many neuronal experiments, the most important data is the indication of spikes, their sources (electrode and identifiable unit within the electrode), and the time of their occurrence. These indications are produced with a hardware spike sorting algorithm, operating at real time, and the Neuroprocessor transmits only the spike indications and avoids sending the raw signal. Such an indication requires much lower communication bandwidth and could be made feasible with low-power wireless links.

In typical present systems, the raw signal from a single neuronal recording electrode is sampled at, e.g., 25 Ksps and digitized at 12 bits/sample, producing a data rate of 300 Kbits/second. The Neuroprocessor generates a 20-bit spike notification message including a time stamp, electrode and source identification. Assuming a (relatively high) spike rate of 100 spikes/second per electrode, the expected data rate is 2 Kbits/second, less than 1% of the raw data rate.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

For a better understanding of the invention with regard to the embodiments thereof, reference is made to the accompanying drawings, in which like numerals designate corresponding elements or sections throughout, and in which:

FIGS. 10a and 10b are graphs of the recorded spikes and their projections on PC space;

FIGS. 13a and 13b are graphic examples where the offsets computed by MPA and by off-line PCA differ;

DETAILED DESCRIPTION OF A PREFERRED EMBODIMENT

The principles and operation of a method and an apparatus according to the present invention may be better understood with reference to the drawings and the following description, it being understood that these drawings are given for illustrative purposes only and are not meant to be limiting.

Figure 1:
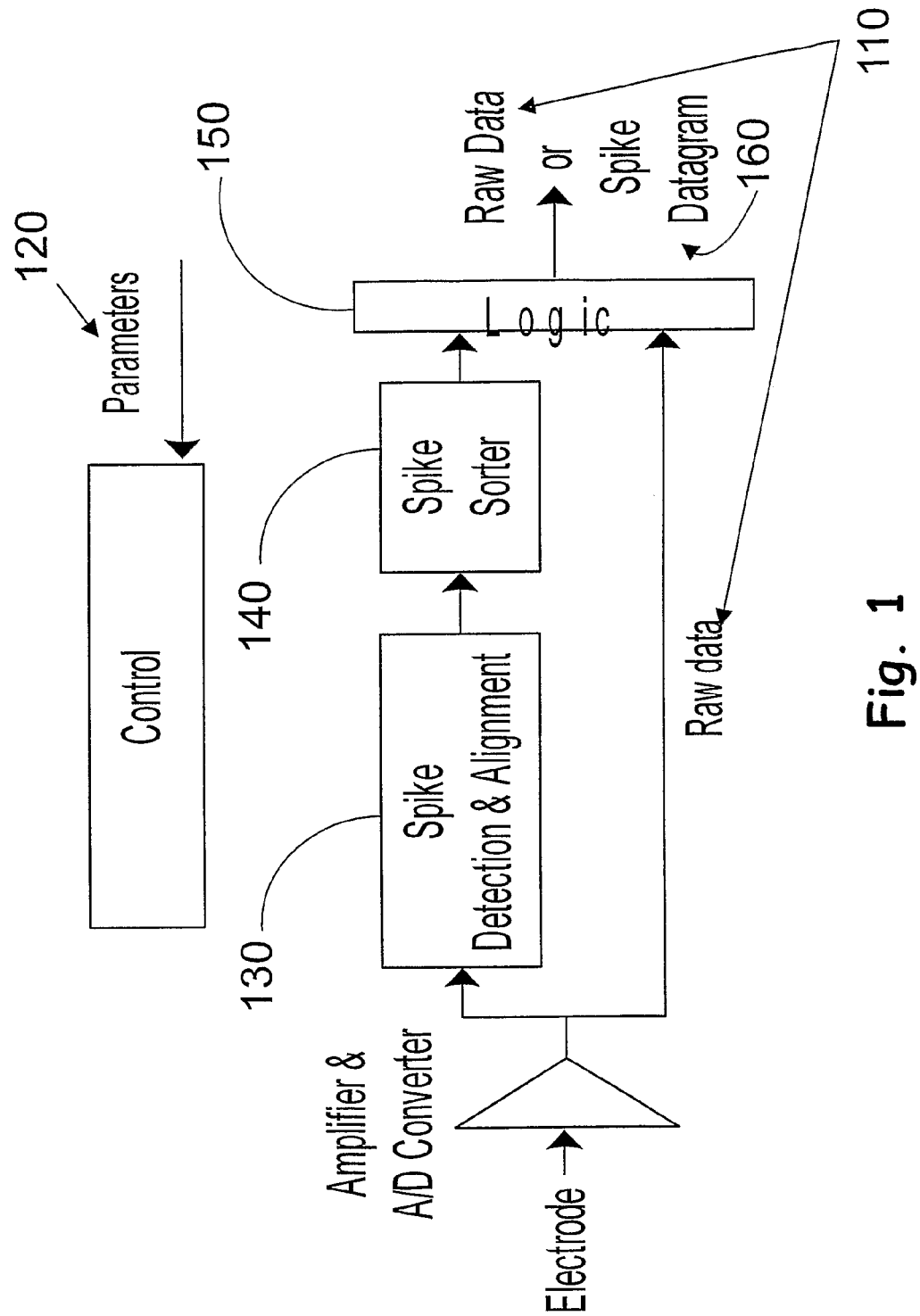
FIG. 1 is a schematic block diagram of the architecture of the part of the Neuroprocessor that processes the signal from a single electrode, constructed in accordance with the principles of the present invention.

FIG. 1 is a schematic block diagram of the architecture of the part of the neuroprocessor that processes the signal from a single electrode, constructed in accordance with the principles of the present invention. Spike processing is preferably adaptable, due to unstable recording conditions. Therefore, periodically, raw data 110 is transmitted to the host computer for training, and the recalculated parameters 120 are sent back to the Neuroprocessor. The Spike Detector 130 detects the presence of spikes in the input, determines their starting point, and initiates the operation of the Spike Sorter 140. The output logic 150 produces the spike notification datagram 160.

Performance of the spike sorter depends critically on the accuracy of the D&A algorithm.

Hardware Algorithms and Architectures for Detection and Alignment

When exploring VLSI architectures for real time spike sorting to be carried out at the head-stage, or in other neuronal recording systems, it is desired to minimize the required resources while still achieving acceptable levels of accuracy. The primary goal is to minimize power dissipation. It is considered that the relative computational complexity of several architectures is a predictor of their power requirements.

Three different spike detection and alignment architectures and algorithms are considered: Maximum Projection Alignment (MPA); Maximum Integral Transform Alignment (MITA); and Segmented PCA (SPCA).

Spike detection for all algorithms is based on threshold crossing. Threshold values are obtained by off-line training on the host computer and downloaded into the Neuroprocessor. They are set to optimize the ratio between the amount of background noise events crossing the threshold and the amount of missed spikes.

It is assumed that most spike waveforms can be represented as a linear combination of a small set of base vectors. The alignment procedure is based on the correlation of the input signal with the base vectors, which are determined off-line and downloaded to the Neuroprocessor. It also assumed that all spikes that are generated by the same neuron are clustered together in the space spanned by the base vectors Maximum Projection Alignment (MPA) Algorithm The Maximum Projection Alignment (MPA) algorithm computes the correlations of the input signal with the first two principal components. It is a VLSI-oriented version of a common software detection algorithm. The MPA algorithm comprises two steps: extraction and alignment, as follows.

1) MPA Extraction

During extraction, a segment of M=K+N samples of the input signal is acquired. Extraction is triggered by threshold crossing at the input. The first K samples precede the triggering crossing event, and the remaining N samples follow it.

2) MPA Alignment

The alignment step seeks a spike of N samples within the M samples segment, starting at an offset $i \in \{1, \ldots, K\}$ from the start of the segment. MPA alignment selects i that yields the maximum correlation of the segment with the first principal component (PC1), represented as a vector of N samples. Thus, it finds i such that $$\text{Proj\_1} = \max_{i=1}^{K+1} \left\{ P1_i = \sum_{r=1}^{N} s_{r+i-1} p1_r \right\} \qquad (1)$$

where $s_j$ are signal samples and $p1_k$ are elements of PC1. An off-line software alignment implementation might store the entire segment $\{s_j\}_{j=1}^{M}$ in memory before searching for the best offset i. For a real-time algorithm, however, we employ a more efficient scheme. Consider the following matrix of products computed in (1):

$$\begin{pmatrix} 0 & 0 & \ldots & \ldots & 0 & 0 & 0 & s_1 x_1 \\ 0 & 0 & \ldots & \ldots & 0 & 0 & s_2 x_1 & s_2 x_2 \\ 0 & 0 & \ldots & \ldots & 0 & s_3 x_1 & s_3 x_2 & s_4 x_3 \\ \vdots & \vdots & \ldots & \ldots & \vdots & \vdots & \vdots & \vdots \\ s_K x_1 & s_K x_2 & \ldots & \ldots & s_K x_{K-3} & s_K x_{K-2} & s_K x_{K-1} & s_K x_K \\ \vdots & \vdots & \ldots & \ldots & \vdots & \vdots & \vdots & \vdots \\ s_N x_{N-K+1} & s_N x_{N-K+2} & \ldots & \ldots & s_N x_{N-3} & s_N x_{N-2} & s_N x_{N-1} & s_N x_N \\ s_{N+1} x_{N-K+2} & & \ldots & \ldots & s_{N+1} x_{n-2} & s_{N+1} x_{N-1} & s_{N+1} x_N & 0 \\ \vdots & \vdots & \ldots & \ldots & \vdots & \vdots & \vdots & \vdots \\ s_M x_N & 0 & 0 & \ldots & \ldots & 0 & 0 & 0 \end{pmatrix} \qquad (2)$$

The matrix is organized such that each row contains only a single input sample $s_i$. The K inner product sums $P1_i$ of (1) are arranged along the K columns of the matrix. The rows of (2) represent the steps of the computation: upon arrival of a new input sample we compute the products listed in the corresponding row and accumulate them in K registers. K is typically smaller than M (e.g. K=64, M=256), thus requiring less storage than the software algorithm and possibly fewer multiplications.

Figure 2:
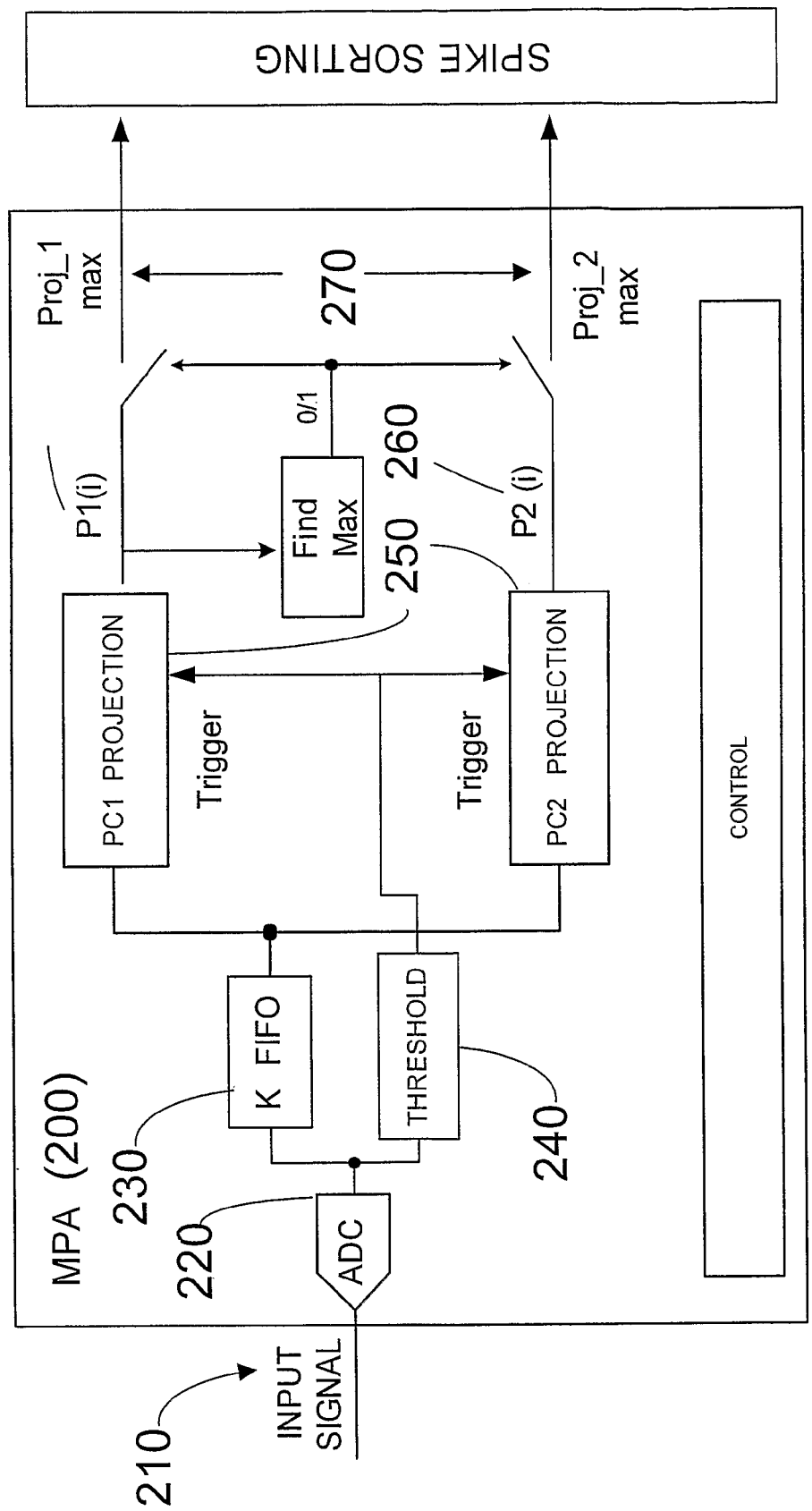
FIG. 2 is a schematic block diagram of the VLSI architecture for the MPA D&A algorithm, constructed in accordance with the principles of the present invention.

FIG. 2 is a schematic block diagram of the VLSI architecture for the MPA D&A algorithm 200, constructed in accordance with the principles of the present invention. The input 210 is digitized by the analog-to-digital converter (ADC) 220 and transferred through a K-stage FIFO 230. The Threshold block 240 triggers operation of the two projection units 250, which compute the K projections according to (1) and produce them at the outputs ($P1_i$ and $P2_i$) 260.

Advantage is taken of the observation that the correlation function in (1) typically shows a single maximum over the entire range i=1, . . . , K. Note that the maximum is computed only on P1. The corresponding projection on PC2 is not used for determining the alignment. The FindMax unit computes the maximum of $P1_i$ by comparing each pair of consecutive projections. Upon detecting a maximum of P1 (at an offfset i), it produces the corresponding projections on both principal components (Proj_1max and Proj_2max 270 in FIG. 2). The two projections are available for use in subsequent spike sorting. If no maximum is detected within the range of possible offsets, the last offset is selected (the spike is aligned with threshold crossing).

Figure 3:
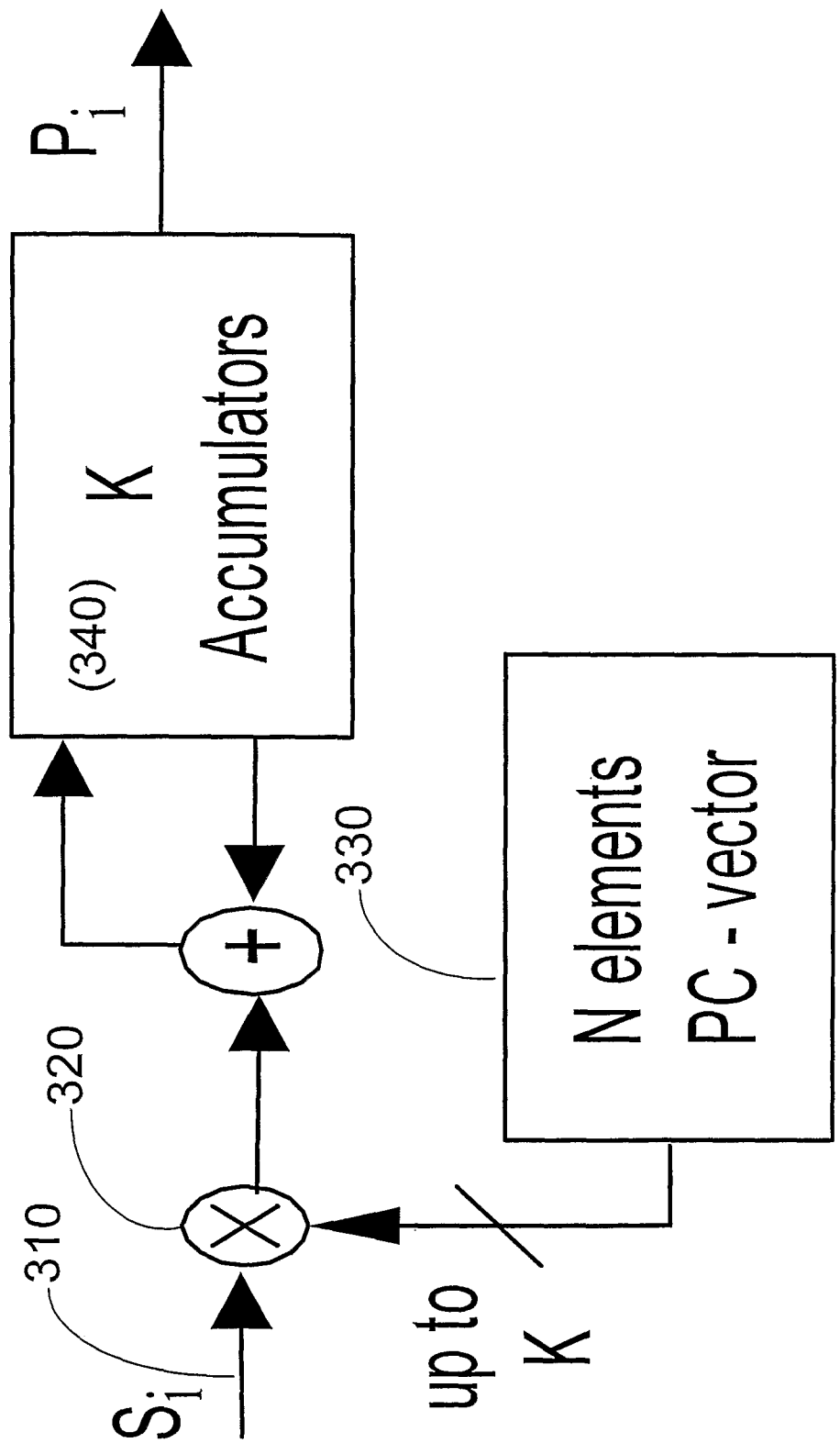
FIG. 3 is a schematic circuit diagram of the detailed VLSI architecture of the projection unit, constructed in accordance with the principles of the present invention.

FIG. 3 is a schematic circuit diagram of the detailed VLSI architecture of the projection unit, constructed in accordance with the principles of the present invention. Upon threshold crossing, each successive input $s_i$ 310 (already delayed by the K-stage FIFO) is multiplied 320 by up to n elements of the principal component vector 330, according to the corresponding row of (2). The products are summed in K accumulators 340.

The MPA architecture provides an efficient real-time implementation of the common software PC-based detection algorithm. One potential shortcoming of MPA is that it employs only PC1 for computing the alignment. In the following section we describe an extension that bases alignment on a more elaborate computation.

Maximum Integral Transform Alignment (MITA) Algorithm

The Maximum Integral Transform Alignment (MITA) algorithm is based on separate integration of the positive and negative phases of the spike. The integral values are useful both for detection and for subsequent spike sorting. As in the MPA case, the MITA algorithm can be divided into two steps, extraction and alignment. The extraction step is identical to that of MPA, whereas alignment uses a different set of base vectors for correlation.

Figure 4:
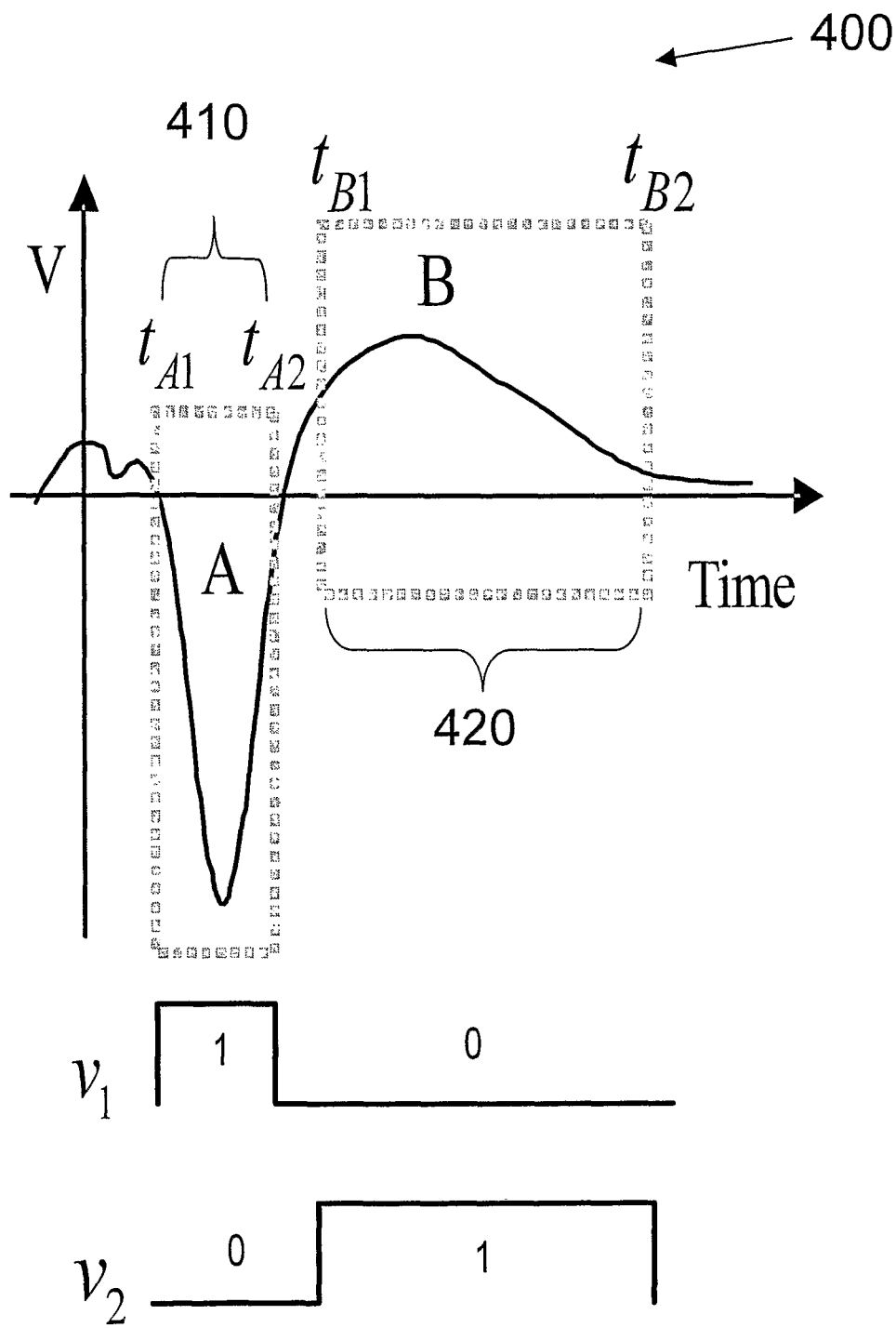
FIG. 4 is a graphical illustration of typical spike integration intervals.

FIG. 4 is a graphical illustration of a typical spike integration intervals 400 on integral space. We define two time windows, A 410 and B 420, matched (by off-line training) to the principal phases of the spike, positive and negative. The MITA algorithm computes two integrals of the signal, over windows A and B, respectively. The computation of said two integrals is repeated for several offset values. The spike is aligned at the offset that yields the maximal value of the (absolute value of) A integral. Once alignment has been determined, the two integral values are produced at the output and can be employed for subsequent spike sorting.

Computing the two integrals can be considered as correlating the input signals with the following two vectors:

$$v_1(r) = \begin{cases} 1, & t_{A1} \le r \le t_{A2} \\ 0, & \text{otherwise} \end{cases}$$

$$v_2(r) = \begin{cases} 1, & t_{B1} \le r \le t_{B2} \\ 0, & \text{otherwise} \end{cases}$$

Figure 5:
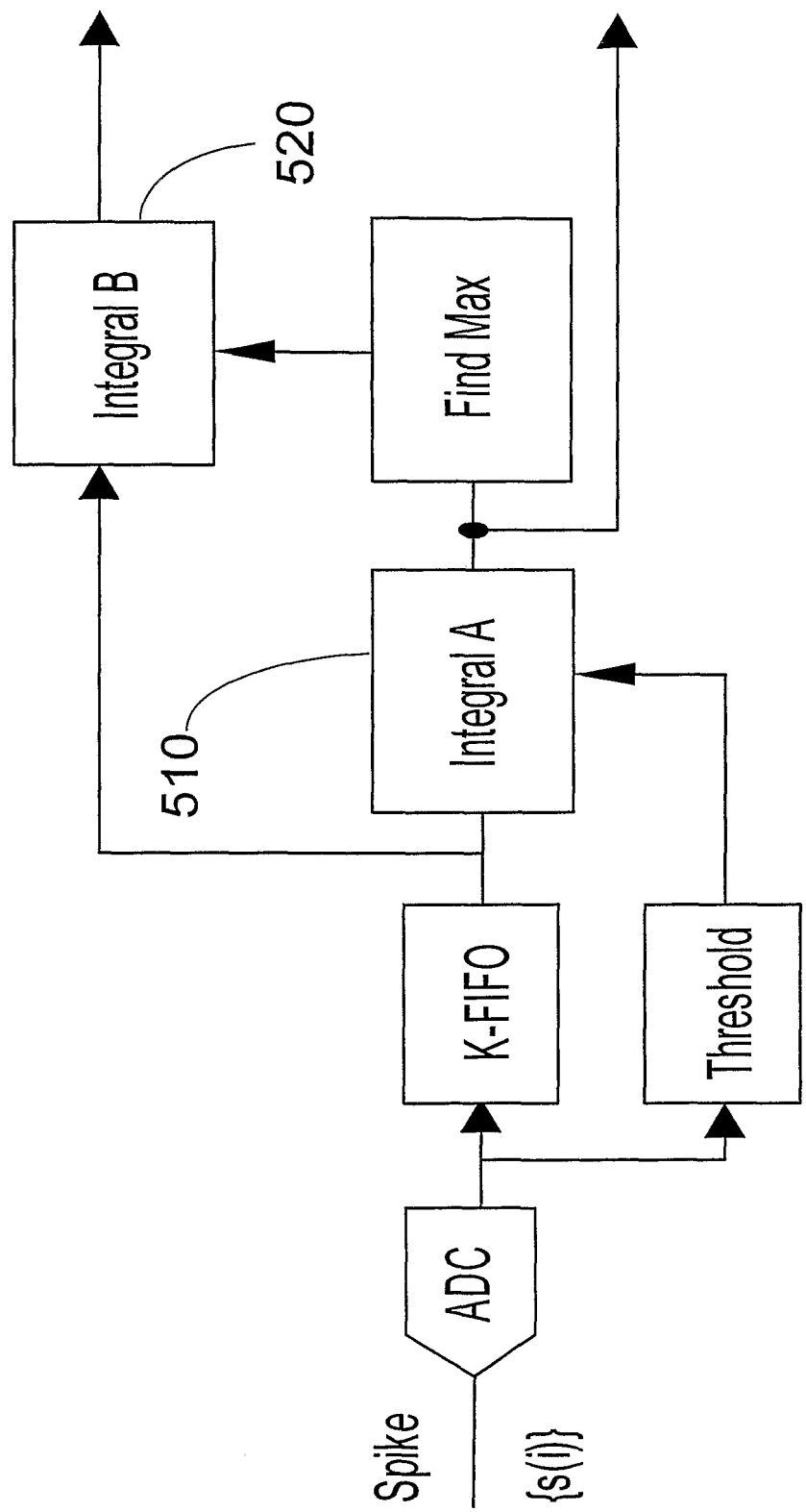
FIG. 5 is a schematic circuit diagram of the VLSI architecture for the MITA D&A algorithm, constructed in accordance with the principles of the present invention.

FIG. 5 is a schematic circuit diagram of the VLSI architecture for the MPA D&A algorithm, constructed in accordance with the principles of the present invention. Since integrals A 510 and B 520 do not overlap in time, first compute integral A 510, find the spike alignment and only then compute integral B 520.

Integration is achieved by a Moving Average filter. Consider the A integral, $$IA_i = \sum_{r=1}^{DA} S_{r+i} \tag{3}$$

Then $$IA_{i+1} = IA_i + s_{i+DA+1} - s_i \tag{4}$$

Figure 6:
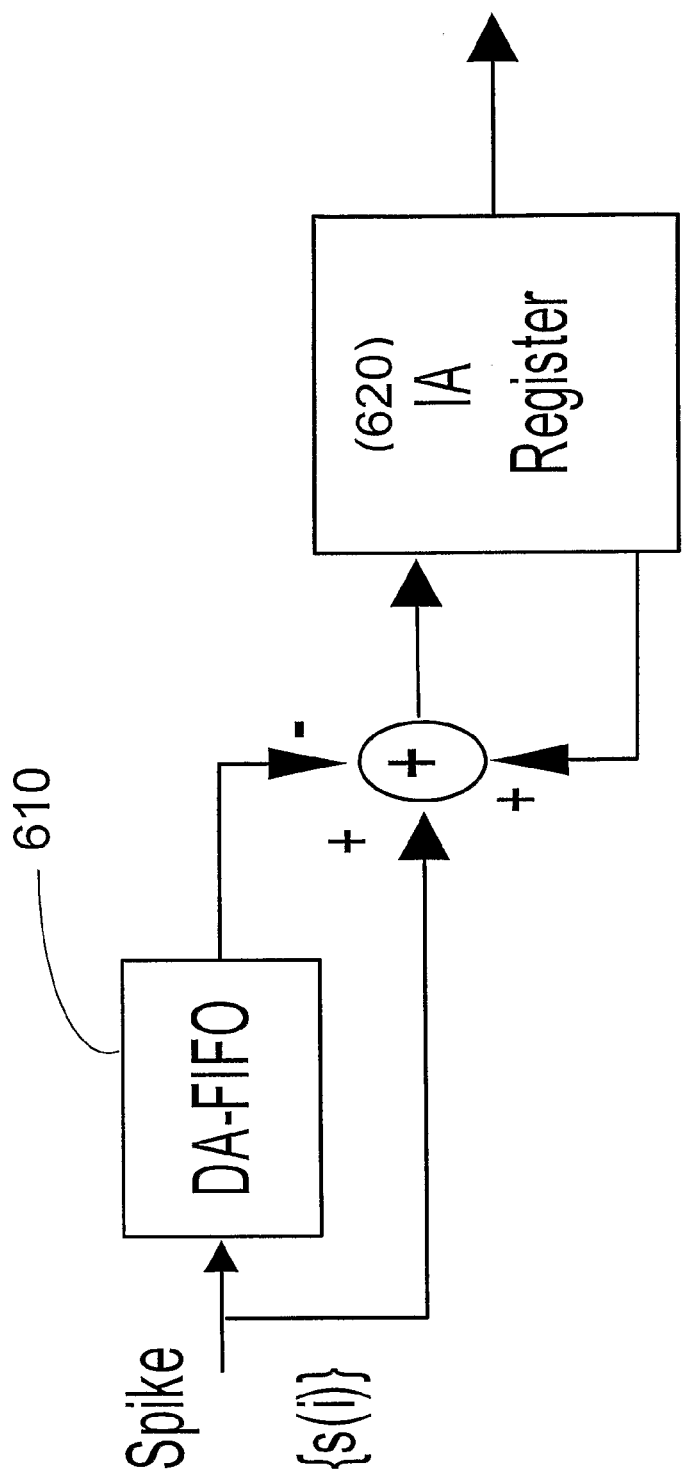
FIG. 6 is a schematic circuit diagram of a recursive implementation of a Moving Average filter for the A integral, constructed in accordance with the principles of the present invention.

FIG. 6 is a schematic circuit diagram of a recursive implementation of a Moving Average filter for the A integral, constructed in accordance with the principles of the present invention. Unlike the MPA architecture, there is no need to maintain K sums in parallel. Initially, the DA-FIFO 610 contains DA zeros. During the first DA steps, the accumulator register 620 computes $IA_1$. Henceforth, one old element is subtracted from IA and a new one is added. Thanks to eliminating multiplications, the MITA architecture incurs a lower hardware cost than MPA.

The following comments may be noted regarding the MITA algorithm. First, it is inspired by the observation that integral A shows a single maximum near the threshold. Second, aligning to the maximum of the signal integral results in lower noise sensitivity than aligning to the maximum of either the signal itself or its derivative. Third, an even more robust algorithm could apply threshold detection to the A integral rather than to the original signal.

Principal Component Detection

A common software algorithm for D&A is based on principal component analysis (PCA). For each potential offset, the signal is projected on the first two principal components, and those projections are used to estimate the signal. The offset which results in minimum estimation error is selected as the best alignment. Formally, the projections at offset i is $$P1_i = \sum_{r=1}^{N} s_{r+i-1} p1_r, \quad P2_i = \sum_{r=1}^{N} s_{r+i-1} p2_r,$$

the estimated signal at offset i is the vector $$E_{i,r} = P1_i p1_r + P2_i p2_r,$$

and the algorithm seeks i that minimizes the error $$ERR_i = \sum_{r=1}^{N} (s_{r+i-1} - E_{i,r}).$$

Figure 7:
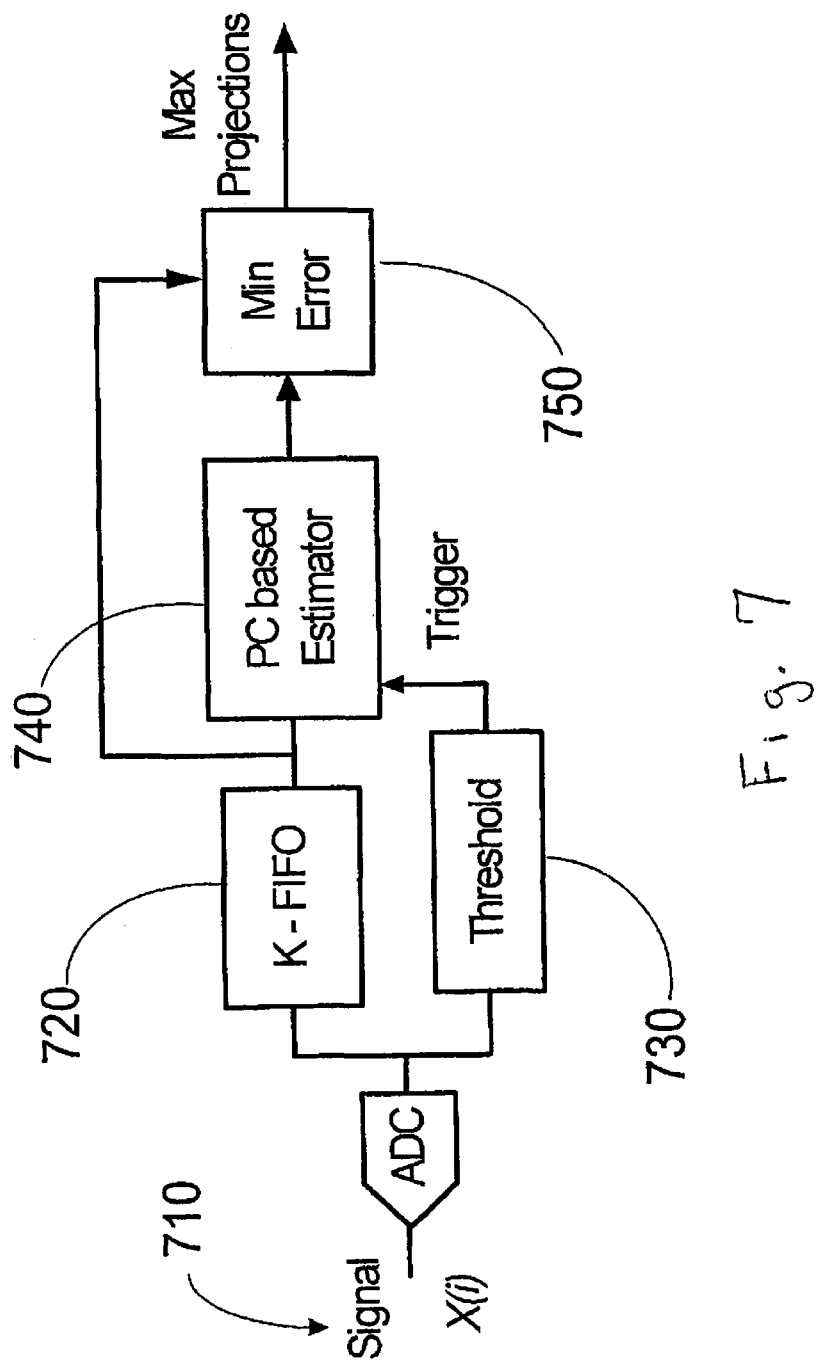
FIG. 7 is a schematic block diagram of VLSI architecture for on-chip D&A by means of PCA, constructed in accordance with the principles of the present invention.

FIG. 7 is a schematic block diagram of VLSI architecture for on-chip D&A by means of PCA, constructed in accordance with the principles of the present invention. The input 710 is transferred through a FIFO register 720 of K stages. The Threshold unit 730 triggers operation of the Estimation unit 740. Estimation unit 740 computes the 2K projections on the two PC vectors (two projections at each offset i) and produces the estimated signal per each i. Once the Min Error unit 750 finds the offset that yields the minimal estimation error, the corresponding projections $P1_i$ and $P2_i$ are sent to the output. If no minimum is detected within the range of possible offsets, the last offset is selected.

Segmented PC Sorting

Figure 8:
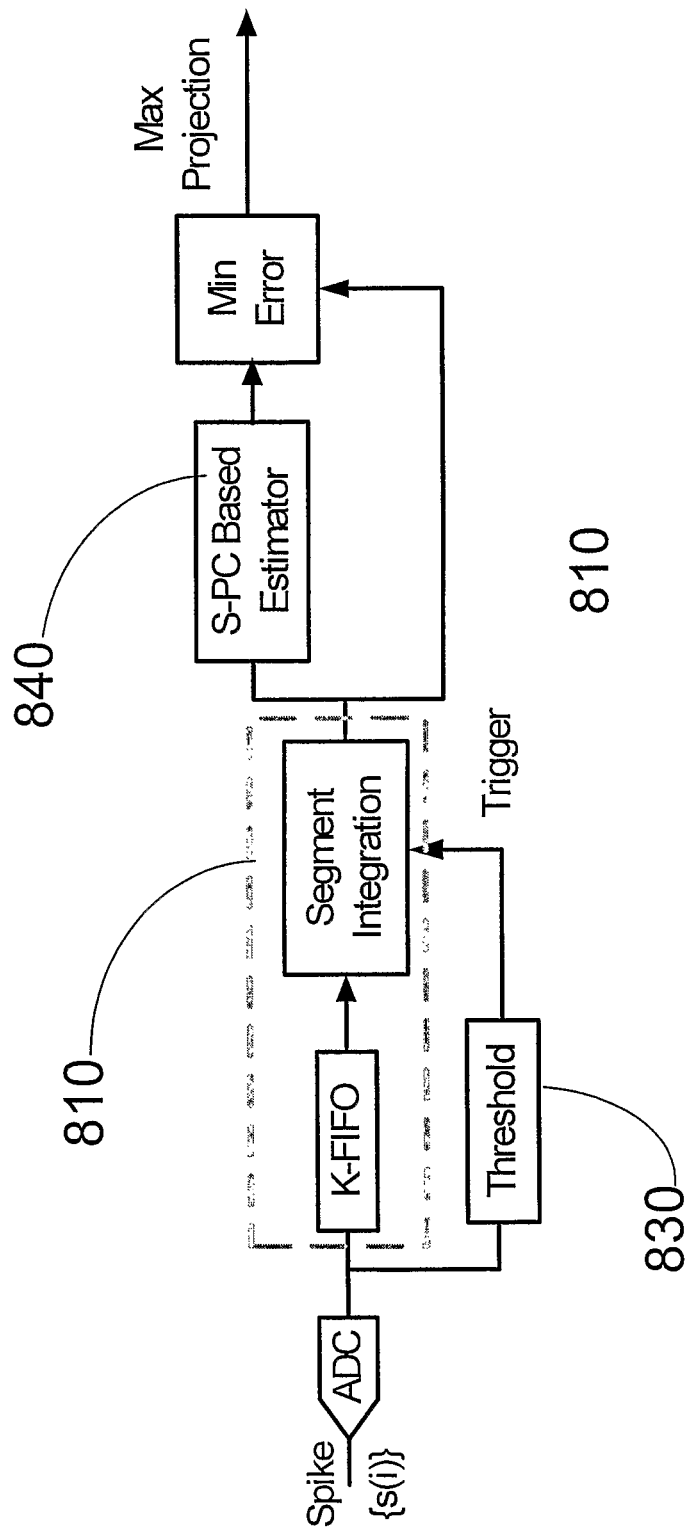
FIG. 8 is a schematic block diagram for VLSI architecture for the segmented K-PC D&A algorithm, constructed in accordance with the principles of the present invention.

FIG. 8 is a schematic block diagram for VLSI architecture for the segmented K-PC D&A algorithm, constructed in accordance with the principles of the present invention. The segmented PC ("K-PC") 810 uses an algorithm that approximates PCA using a reduced number of multiplications. The Threshold unit 830 triggers operation of the S-PC Based Estimation unit 840. This is achieved by down-sampling the principal components. The signal is integrated over several time intervals ($k_1$ intervals for $PC_1$ and $k_2$ intervals for $PC_2$). Each integral is multiplied by the average of the principal component values over the respective interval, as follows:

$$S_1 = \sum_{p=1}^{k_1} I_1(p) \cdot \alpha(p)$$

where $$I_1(p) = \sum_{i \in interval\ p} s_i, \quad \alpha(p) = \text{Average}\{p1_i\}_{i \in interval\ p}$$

The expressions for $S_2$ are similar.

Another level of savings in computational complexity can be achieved by approximating the multiplication coefficients $\alpha(p)_{1,2}$ by powers of 2 (and thus the multiplications are achieved by simple bit-shifting).

Results

Algorithm Validation

D&A algorithms are evaluated based on the accuracy of the subsequent spike sorting, since sorting is heavily dependent on the quality of D&A. A standard, PCA-based software sorting algorithm is employed in the evaluation. All D&A algorithms are applied to the same data set, comprising a large number of digitized recorded spikes.

Figure 9:
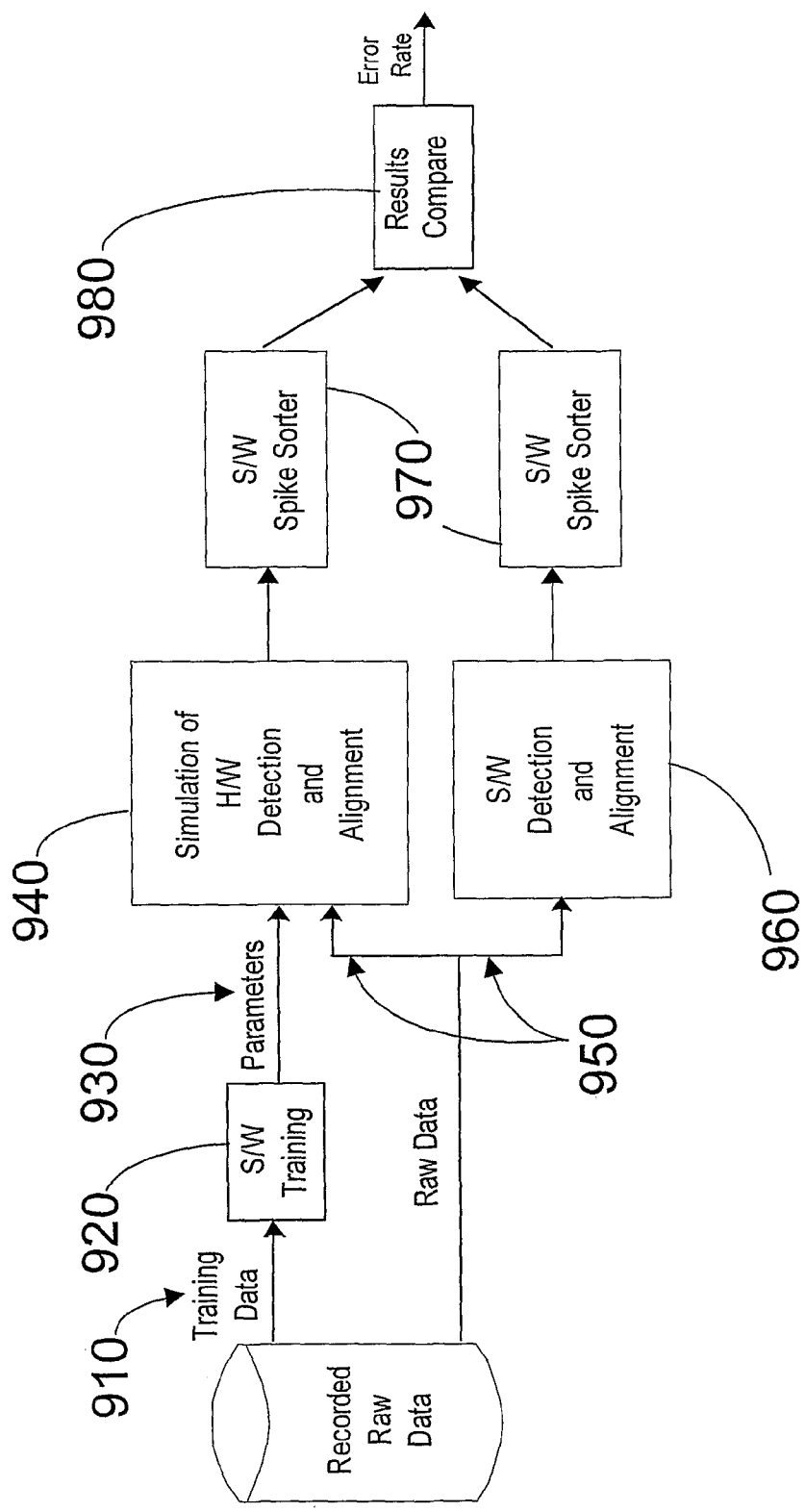
FIG. 9 is a schematic block diagram illustrating the D&A algorithm validation scheme, constructed in accordance with the principles of the present invention.

FIG. 9 is a schematic block diagram illustrating the D&A algorithm validation scheme, constructed in accordance with the principles of the present invention. First, part of the data 910 is used for off-line training 920, producing configuration parameters 930 for the hardware algorithm. Second, parameters 930 are downloaded into the Neuroprocessor. Third, the Neuroprocessor hardware D&A algorithm 940 is applied to the entire data set 950. The software D&A algorithm 960 is also applied to the same data 950, and the results of both hardware and software algorithms are processed by the software spike sorter 970 and compared 980. The results are reported in Table 1 below.

Spike Data Preparation

Real spike data was taken from electrophysiological recordings of multiple spike trains, obtained from various cortical neurons. Neuronal signals from the electrodes were amplified, bandpass filtered (300-6000 Hz, four poles Butterworth filter), and sampled at 24 Ksps/electrode. The data is up-sampled 4 times for improved alignment precision. Spikes last about 2 msec, resulting in 200 samples per spike. Software spike detection and alignment were first applied on the data sets; only stable spike trains (as judged by stable spike waveforms and stable firing rate) were included in this study. The data set contained about 1,000 spikes per cluster.

Figure 10B:
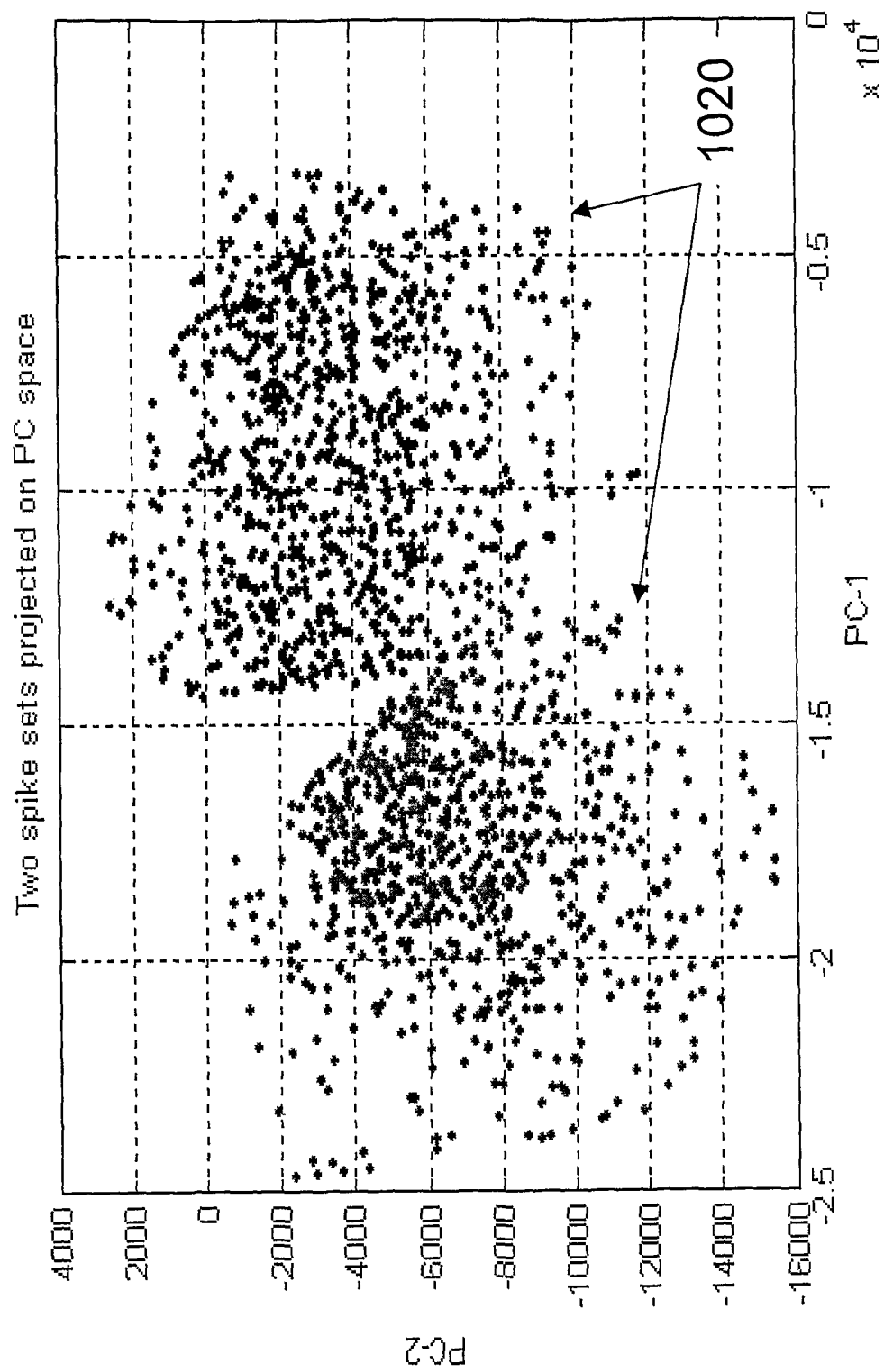

FIGS. 10a and 10b are graphs of the recorded spikes and their projections on PC space. To validate the performance of the proposed architectures on a particularly hard case, one with near-by clusters sharing an edge was chosen. FIG. 10a shows several recorded spikes after extraction and alignment 1010. FIG. 10b shows clusters 1020 in PCA space.

Figure 12A:
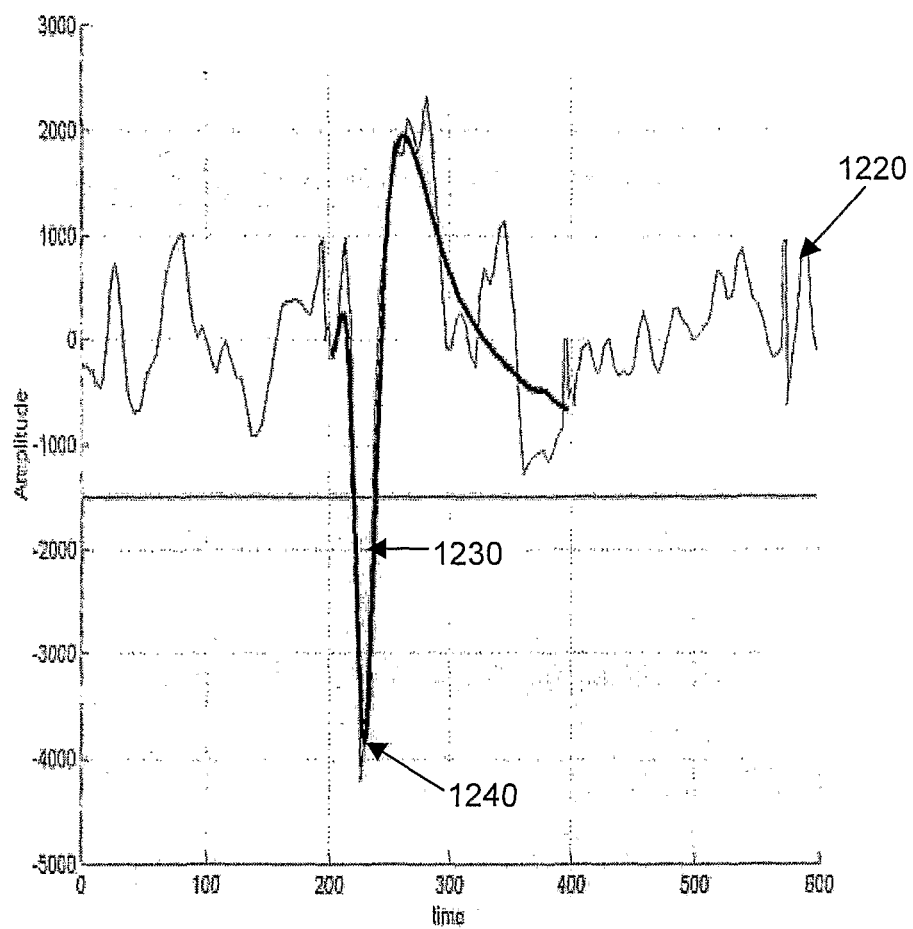
FIGS. 12a and 12b are graphic illustrations of the operation of the MPA algorithm.

For evaluation of the hardware algorithms (implemented and simulated in MATLAB), segments of background noise, recorded from the same system, were added at the beginning and the end of every spike. An example of one such segment is shown in FIG. 12a described below. That way the starting point and the cluster of every spike are known, yet such an arrangement is very close to the real data.

The principal cost measure of the various architectures is their computational complexity, which is roughly related to their power consumption. The number of additions and multiplications required in every algorithm for processing a single spike are counted. Multiplication is counted as about ten additions, and computational complexity is expressed in the total number of equivalent additions.

Analysis of Spike D&A Algorithms

Figure 11:
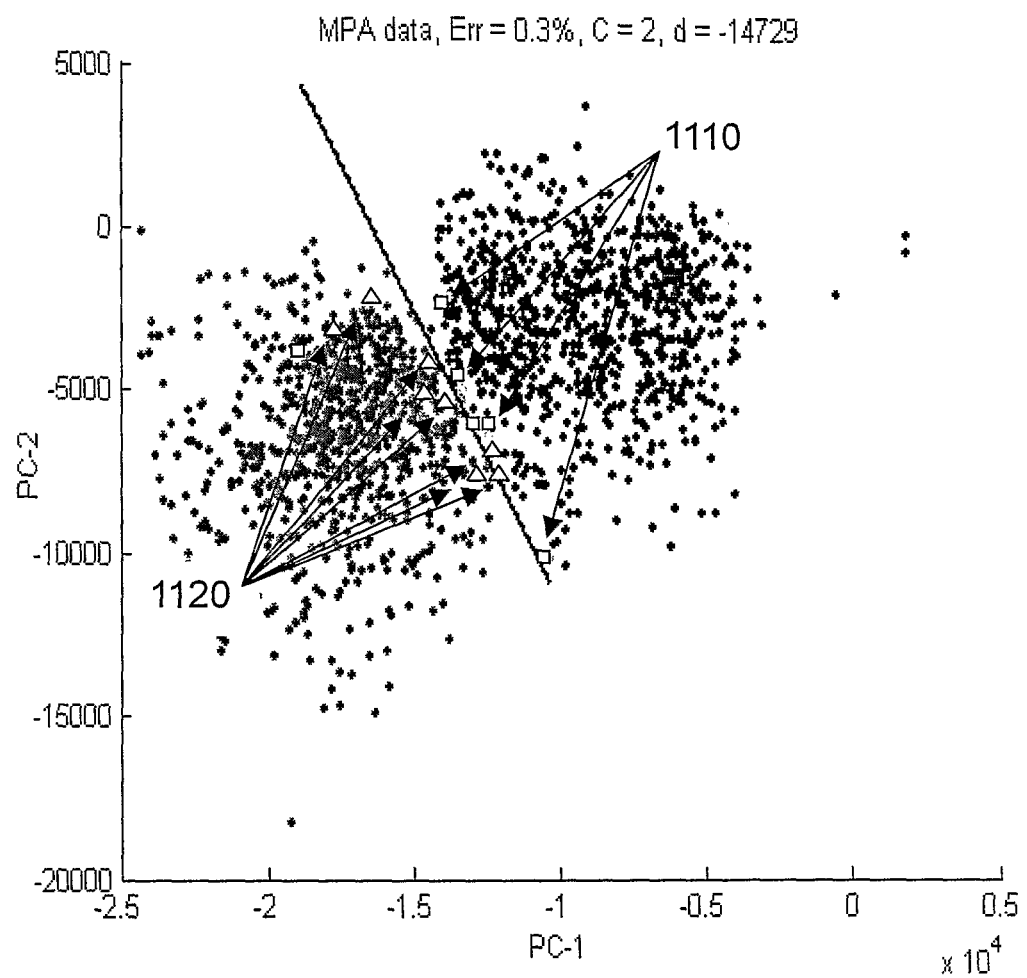
FIG. 11 is a graph of the results of a linear classifier applied to the output of the MPA

FIG. 11 is a graph of the results of a linear classifier applied to the output of the MPA D&A algorithm to simulate the MPA hardware algorithm. Most classification errors occur near the common edge of the two clusters. Compared to the PCA off-line algorithm, developed by Alpha-Omega Eng., the MPA algorithm obtains similar results: the sorting error is small (0.3%, Table 1), and the clusters appear visually identical, with reference to FIG. 10b. Mis-classified spikes are indicated by square points 1110 and triangular points 1120.

Figure 12B:
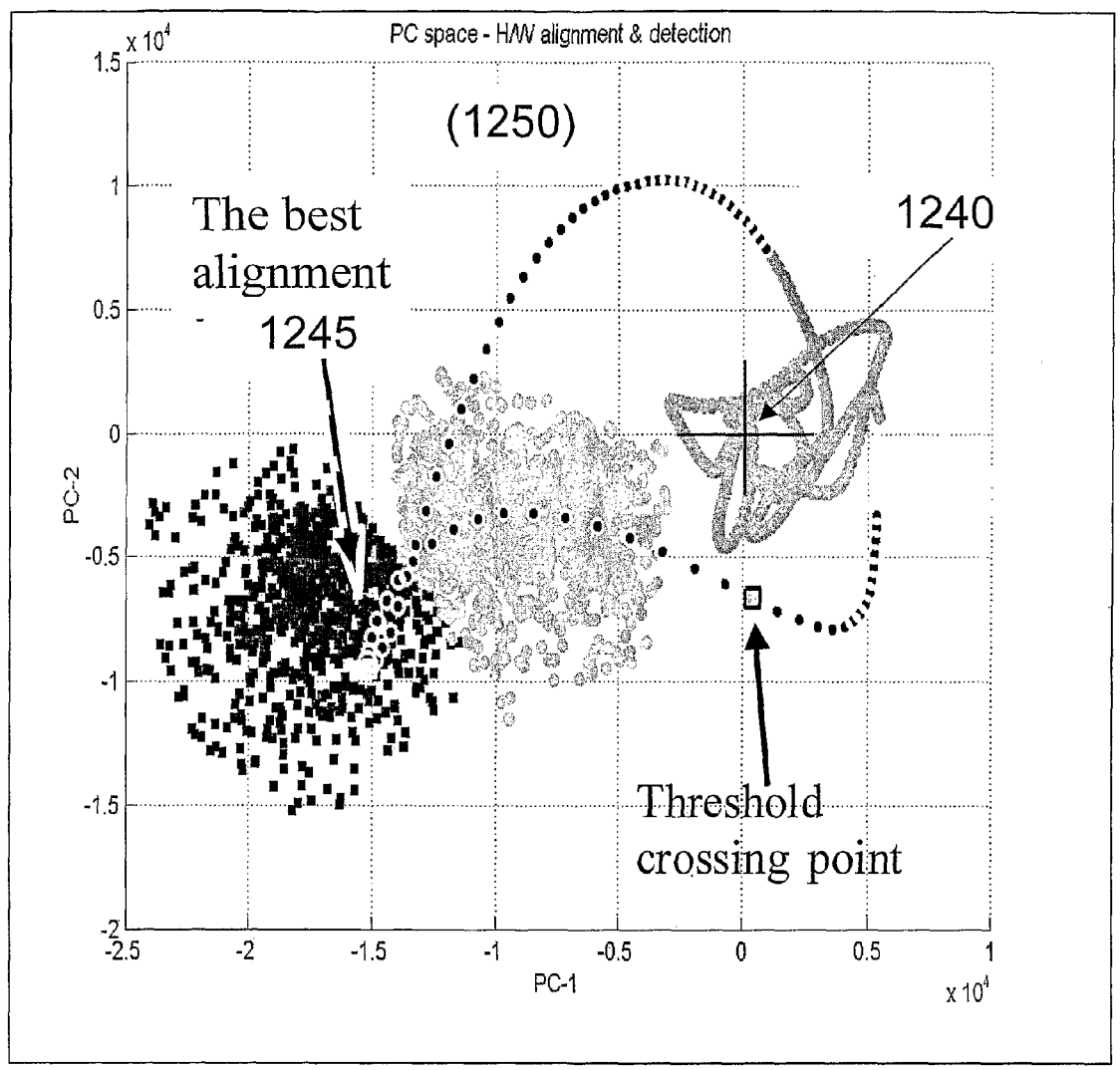

FIGS. 12a and 12b are graphic illustrations of the operation of the MPA algorithm. The MPA algorithm continuously computes the correlation of the input signal with the first PC vector. This can be represented as a trace of points on the PC space (FIG. 12b), each point corresponding to a different offset value. When no spike is present at the input, the trace fluctuates around zero as a result of correlation with the background noise 1220. When a spike 1230 is present, the trace leads away from the origin 1240, and the peak 1245 corresponds to the alignment point of the spike. FIG. 12a shows the synthetic signal combining noise segments with a real spike 1200. FIG. 12b traces the points on the PC space 1250.

Figure 13A:
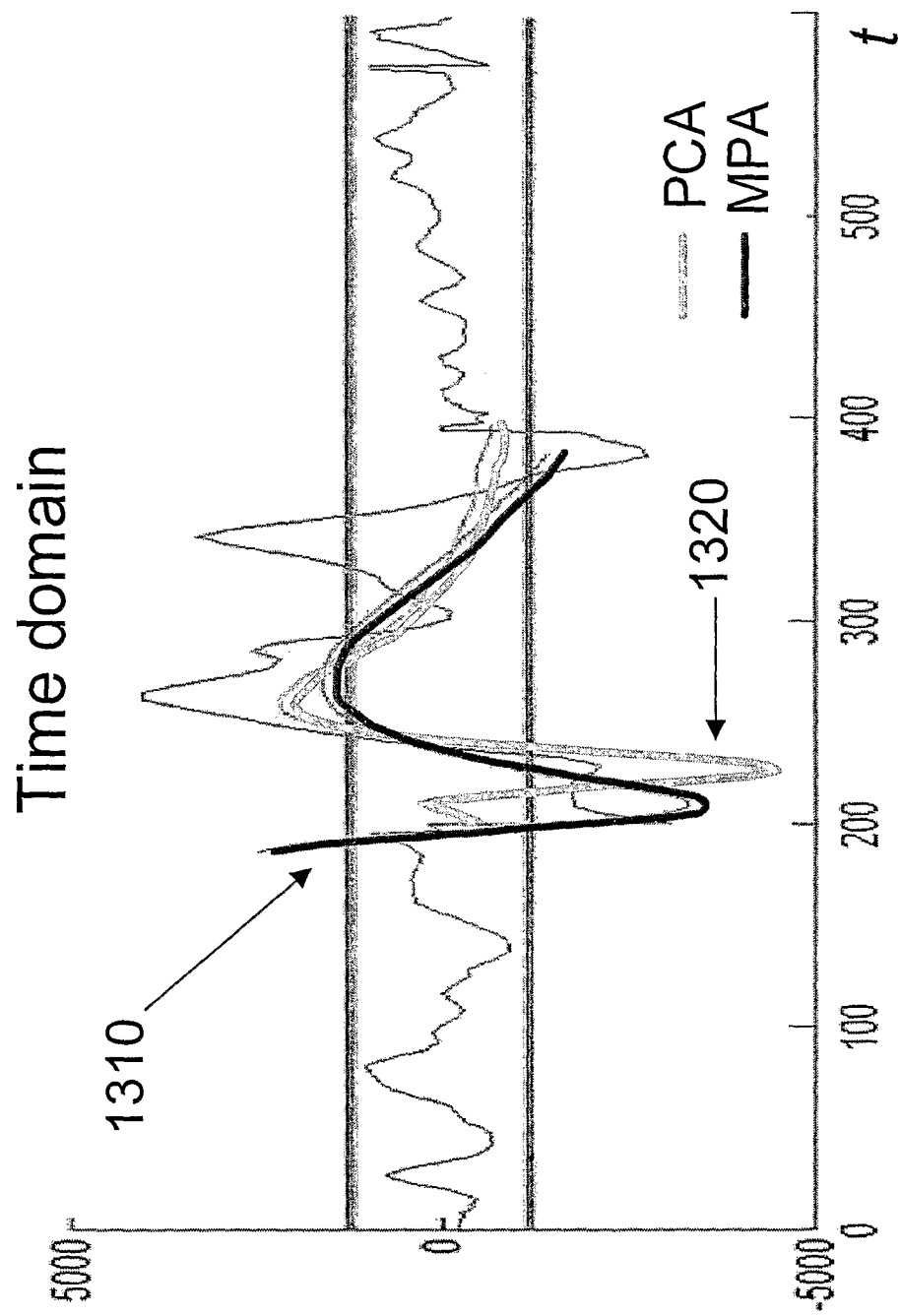

FIGS. 13a and 13b are graphic examples where the offsets computed by MPA 1310 and by off-line PCA 1320 differ. The two circles 1331 and 1332 on PC space show that the two offsets lead to different mappings. However, both results map the spike into the same cluster 1331 in FIG. 13b. Similar behavior characterizes the remaining simulated algorithms.

Figure 14:
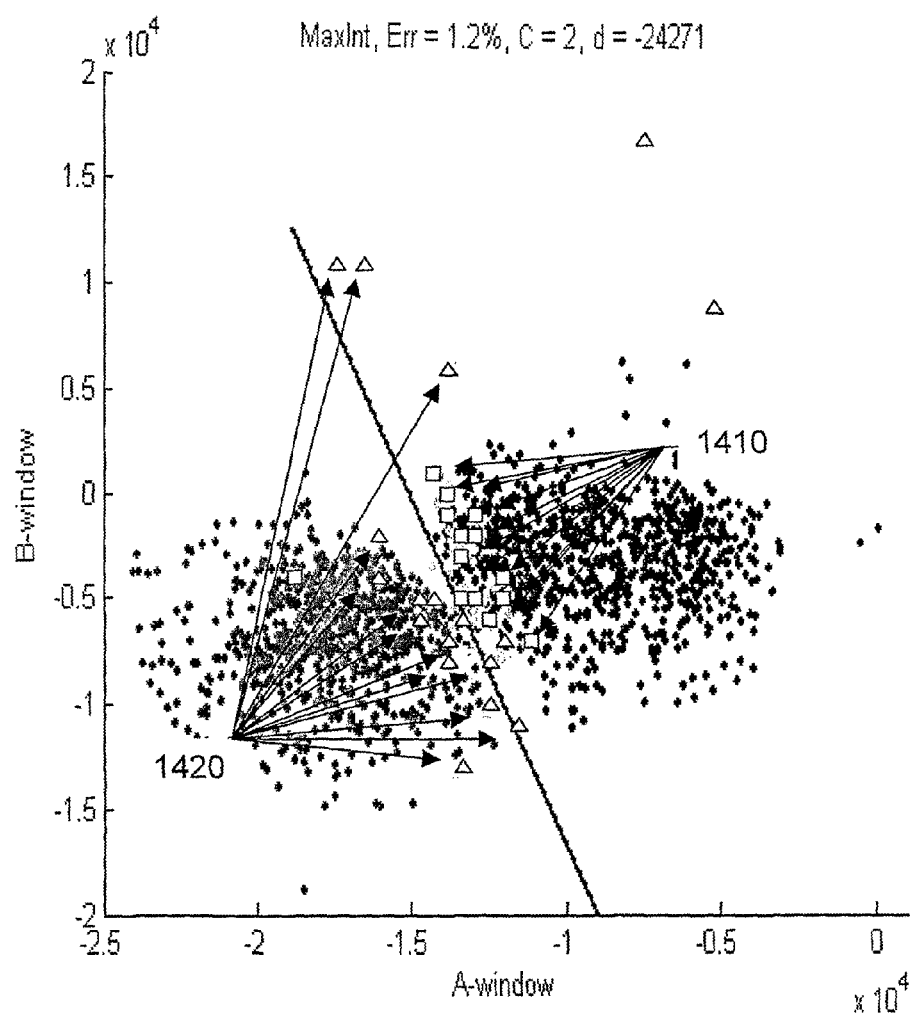
FIG. 14 is a graph showing the results of the MITA algorithm projected on PC space and linearly classified using SVM technique.

FIG. 14 is a graph showing the results of the MITA algorithm projected on PC space and linearly classified using SVM technique and simulation results of the MITA algorithm. Mis-classified spikes are indicated by square points 1410 and triangular points 1420.

Comparison

Figure 15:
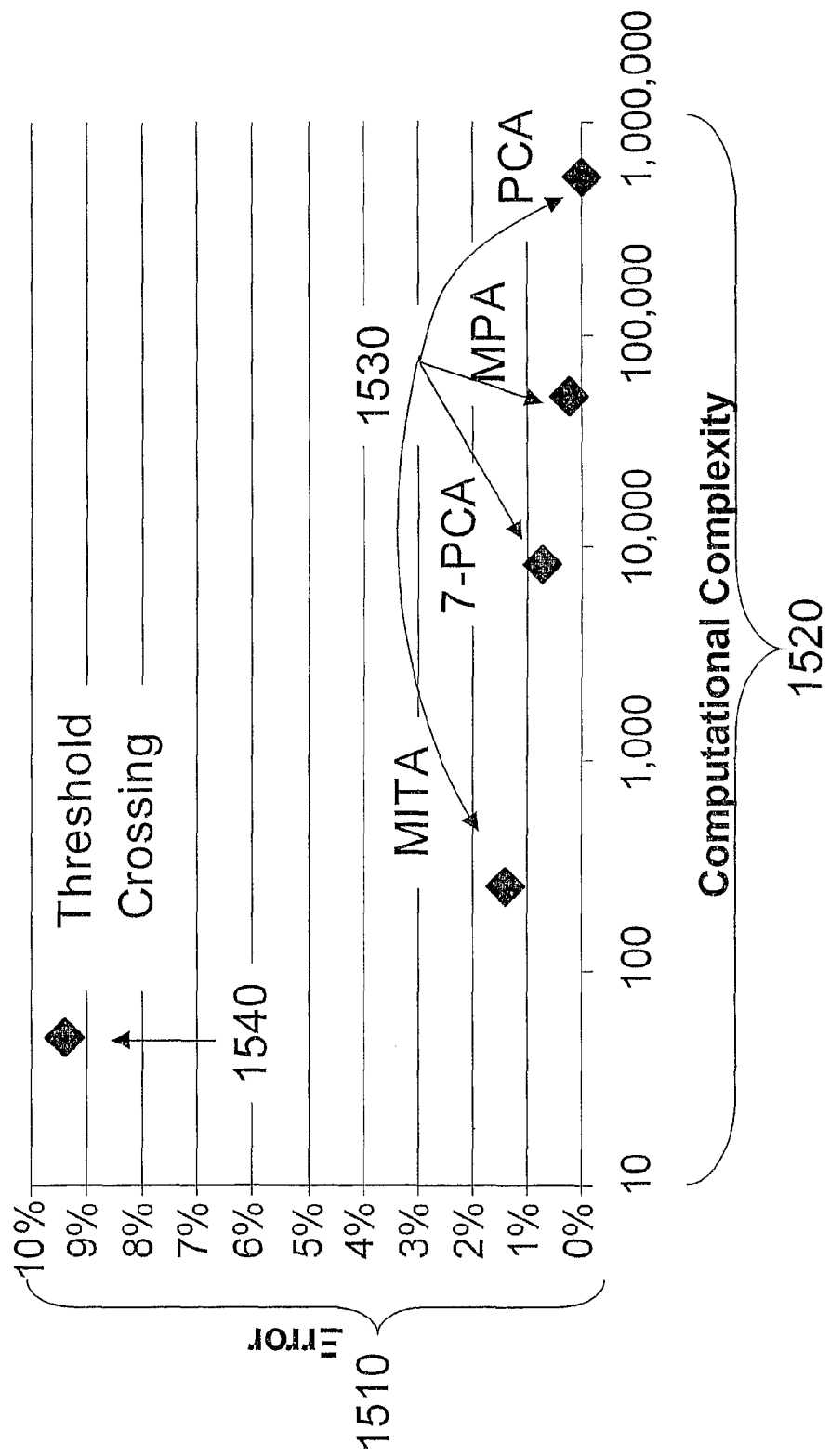
FIG. 15 is a graph of Classification error vs. computational complexity.

FIG. 15 is a graph of classification error 1510 vs. computational complexity 1520. The computational complexity and error rate of the various spike D&A algorithms 1530 and architectures are compared in Table 1 and FIG. 15 for K=50 and spikes of 200 samples. Table 1 shows computational complexity and classification errors of the spike D&A architectures. The algorithms were applied to a difficult data set, in which the two spike clusters were very close to each other. The error rate of the algorithms was maximal in this case (when clusters are further apart, lower detection and alignment error rates are obtainable). For sake of comparison, an experiment based solely on threshold crossing 1540 (marked Threshold in the table) was also performed, where spikes are assumed to begin with the threshold crossing.

TABLE 1

| Algorithm | Additions | Multiplications | Computational Complexity | Classification Error |
|---|---|---|---|---|
| Threshold | 50 | 0 | 50 | 9.4% |
| MITA | 250 | 0 | 250 | 1.2% |
| 7-PCA | 1,200 | 700 | 8,200 | 0.7% |
| MPA | 5,200 | 5,200 | 57,200 | 0.3% |
| PCA | 50,000 | 50,000 | 550,000 | 0.0% |

K = 50, N = 200, M = K + N = 250

Based on these results, three observations can be made: (a) the MPA algorithm performs as well as the software D&A, but incurs a high computational complexity; (b) the MITA algorithm achieves about 99% precision at about 0.05% of the complexity (relative to PCA); (c) MITA constitutes the "knee point" of the complexity versus error graph, and is thus suggested as the preferred architecture.

Conclusions for Spike Detection and Alignment

Low-power architectures and algorithms for spike detection and alignment (D&A) have been considered. Such systems may be useful for implanting near recording electrodes, or for using in large multi-electrode arrays, in either research or clinical applications. These systems enable substantial reduction of the communication bandwidth, which is essential when a large number of recording electrodes is involved.

Three VLSI architectures have been described and analyzed: Maximum Projection Alignment (MPA), Maximum Integral Transform Alignment (MITA), and Segmented PC (S-PC). The algorithms have been simulated with real data obtained from neuronal recordings. The results are analyzed in terms of classification errors (relative to sorting achieved with software PCA classification) and computational complexity (estimated based on the number of additions and multiplications). The MITA algorithm yields only marginal accuracy degradation relative to PCA, while incurring only a very small fraction of the computational complexity. Thus, the MITA algorithm for power-efficient spike detection in a neuronal processing integrated circuit has been selected.

Reference is now made again to FIG. 1 above. Again, the signal is first amplified and digitized The Spike Detector detects the presence of spikes in the input, determines their starting point, and initiates the operation of the Spike Sorter. Both spike detection and sorting must be adaptable, due to unstable recording conditions. Therefore, raw data is periodically transmitted to the host computer for retraining and recalculated parameters are sent back to the Neuroprocessor. At all other times, the spike signal is processed by the Spike Detector and Spike Sorter. The output logic produces the spike notification message.

Sorting Algorithms and Architectures

When exploring VLSI architectures for real time spike sorting to be carried out at the head-stage or in other neuronal recording systems, it is preferable to minimize the required resources while still achieving acceptable levels of accuracy. The primary goal is to minimize power dissipation. The relative computational complexity of a few architectures is considered, as a predictor of their power measure.

In an alternative embodiment, signal processing VLSI architectures employ some analog computations to reduce power dissipation, instead of exclusively digital architectures.

Five different hardware sorting algorithms are considered. The first two algorithms, Hard Decision (HD) and Soft Decision (SD), perform classification in the time domain. The remaining three algorithms, Integral Transform (IT), Principal Component Sorting (PC) and Segmented PC (k-PC), classify in transform domains.

A. The Hard Decision (HD) Algorithm

The Hard decision (HD) algorithm compares the spike signal with a pre-computed separation line. It is relatively simple to implement in VLSI and incurs a low computational complexity, potentially requiring small circuit area and dissipating low power. However (as discussed beginning with FIG. 25 below), it is sensitive to noise, resulting in rather high classification errors.

The HD algorithm operates as follows. The preliminary recorded spikes in the training set are clustered into separate groups. Clustering can be humanly supervised or unsupervised.

Figure 16A:
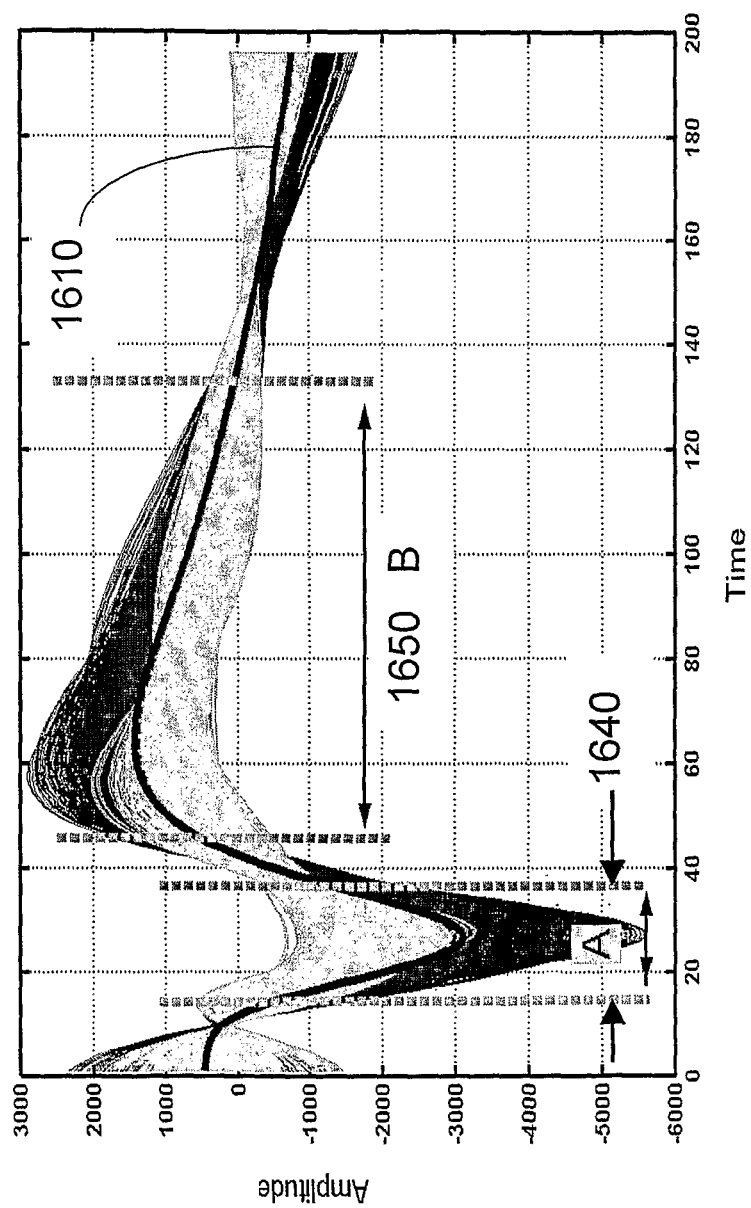
FIG. 16a is a graphical example of a separation line.
Figure 16B:
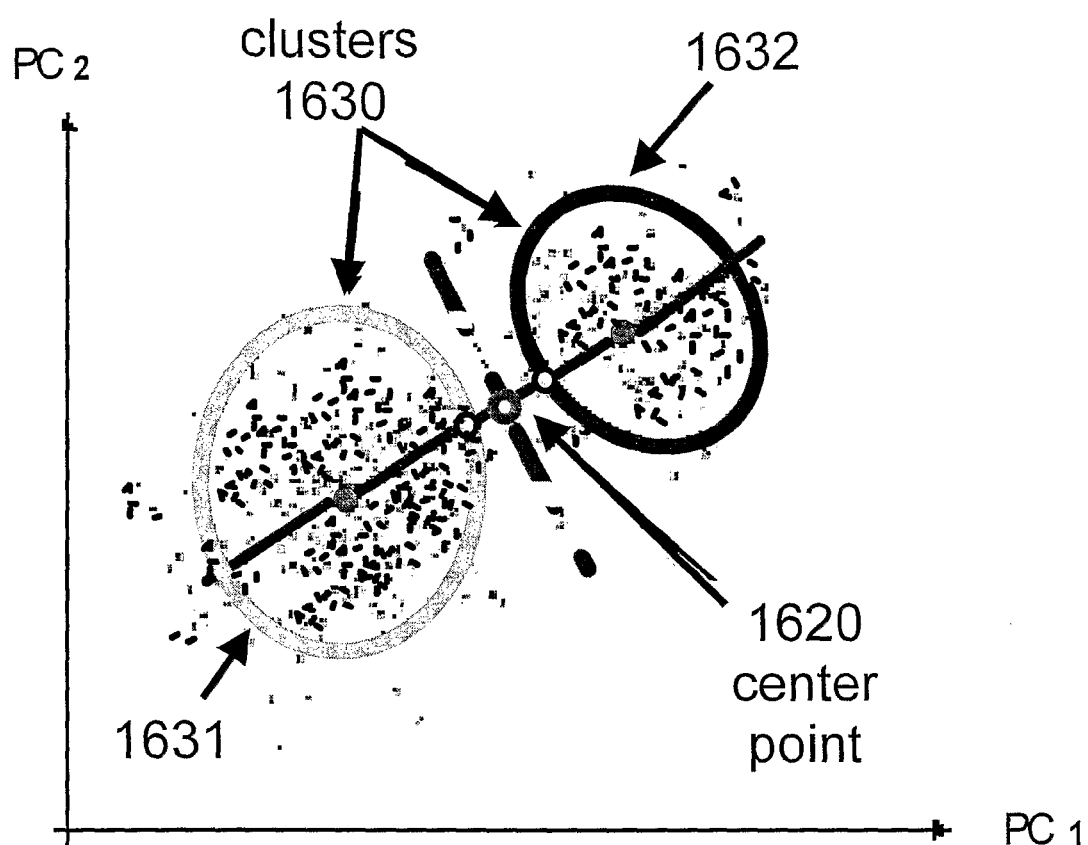
FIG. 16b is a graphical example of two clusters in a space spanned by the first two principal components ("PC space"), showing also that the separation line of FIG. 16a can be generated by the inverse PCA transform of a "center point" (on the PC space) that is placed between the two clusters.

FIG. 16a is a graphical example of a time series representation of two clusters in a space spanned by the first two principal components ("PC space"). The separation line 1610 is represented by the dark waveform line. FIG. 16b is a graphical example showing that separation line 1610 (of FIG. 16a) can be generated by the inverse PCA transform of a "center point" 1620 (on the PC space) that is placed between the two clusters 1630. However, when the clusters are too close to each other, the separation line may need to be generated directly on the time series representation (FIG. 16a). The spike signal can then be split into several time intervals, according to the first phase A 1640 and second phases B 1650 of the spikes. For each time interval one can determine whether a spike of a specific cluster is expected to have values either above or below the separation line. For instance, spikes of the lightly colored cluster 1631 are above the separation line in time interval A 1640 and below it in time interval B 1650. The reverse is true for dark cluster 1632. This algorithm may also be generalized for cases where more than two separate units (neurons) are identifiable.

Figure 17:
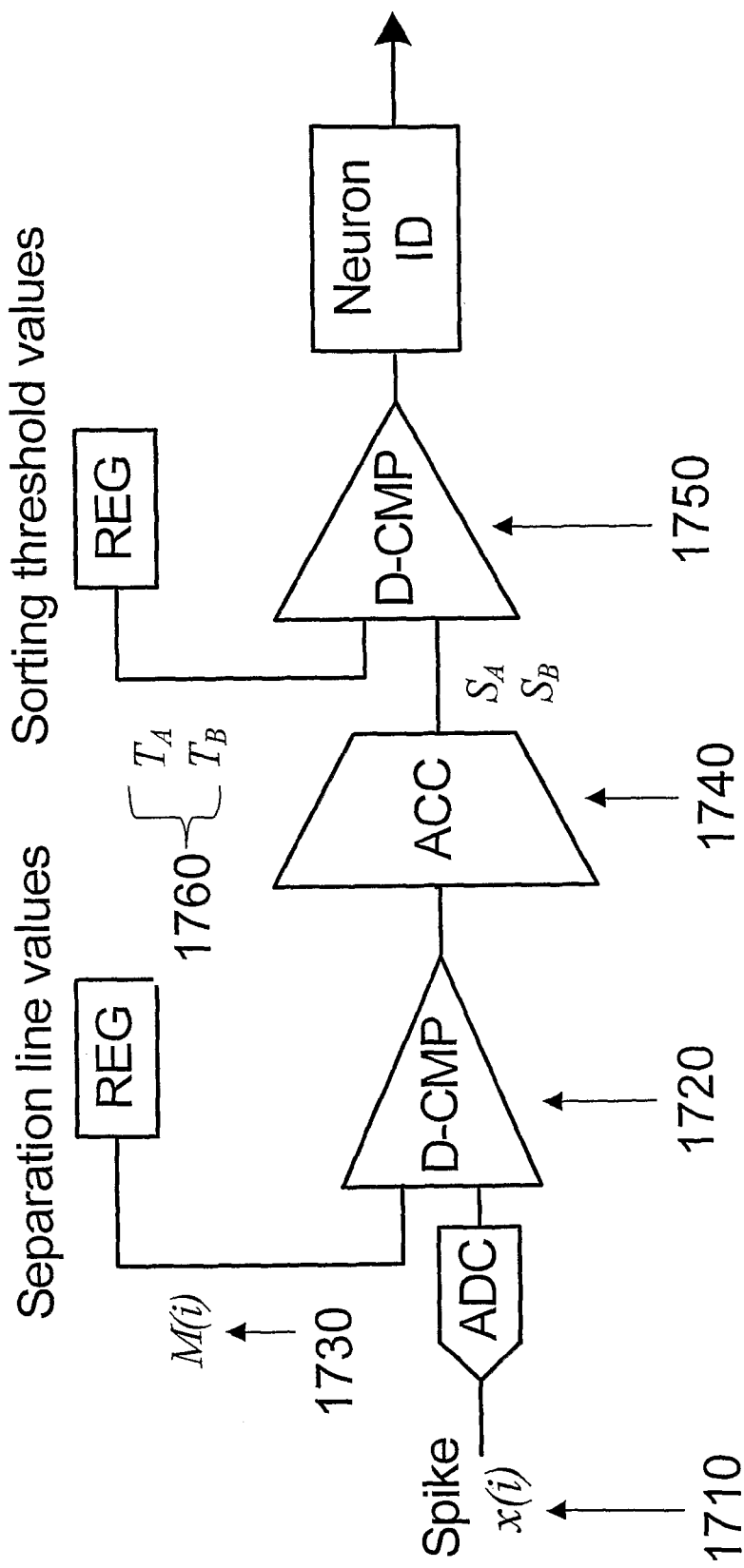
FIG. 17 is a schematic diagram of the VLSI architecture for the HD sorting algorithm, constructed in accordance with the principles of the present invention.

FIG. 17 is a schematic diagram of the VLSI architecture for the HD sorting algorithm, constructed in accordance with the principles of the present invention. The input x(i) 1710 is compared 1720 to the synchronized value of the separation line M(i) 1730. The comparator outputs are a series of bits, which are accumulated 1740 into $S_A$ and $S_B$, during the A and B time intervals, respectively. These two sums represent the number of signal points within the respective time intervals that are above the separation line. In the second stage, these sums are compared 1750 with the sorting threshold values $T_A$ and $T_B$ 1760. If the two comparisons agree with the predefined values, a "spike notification message" is sent to the host computer. For instance, a spike from the light cluster (1631 in FIG. 16b) would generate a high number in time interval A (ideally equal to the number of samples included in A) and a low number (ideally zero) in time interval B. The computational complexity and sorting performance (in terms of errors relative to an off-line PCA algorithm) are discussed beginning with FIG. 24 below.

Formally, consider a discrete-time signal input:

$$\{x(i)|i=1,\ldots,N\},$$

two index sets (corresponding to two decision intervals in the time domain):

$$A=\{x(i)|i_1\le i\le i_2\}, B=\{x(x)|i_3\le i\le i_4\},$$

and a given discrete-time separation line $\{M(i)|i=1,\ldots,N\}$. Note that all given factors (short of the input signal) are pre-computed by means of off-line training. First, compute two sums:

$$S_A = \sum_{i\in A}(x(i)>M(i)),$$

$$S_B = \sum_{i\in B}(x(i)>M(i)),$$

Then the classification is made as follows:

$$\text{Class} = \begin{cases} \text{I}, & \text{if } U_A S_A - T_A \ge 0 \text{ and } U_B S_B - T_B \ge 0 \\ \text{II}, & \text{if } U_A S_A - T_A < 0 \text{ and } U_B S_B - T_B < 0 \\ \text{unsorted}, & \text{otherwise}. \end{cases} \quad (5)$$

where $T_A$, $T_B$ are two threshold values and $U_A$, $U_B \in \{-1, 1\}$ are two sign values that indicate whether S is expected to be larger or smaller than T for each of the two time intervals and for each of the two clusters. The sorting performance of the HD algorithm may be improved by considering more than two decision intervals.

The Soft Decision (SD) Algorithm

The Soft Decision (SD) sorting algorithm is similar to the HD algorithm, but classification is made as follows: the input signal is integrated for each of the pre-defined time intervals and the integrals are compared with the respective integrals of the separation line. Note that while the HD algorithm sums up (within each time interval) the results of comparing the signal with the separation line, the SD algorithm on the other hand performs the summation first and then compares the signal with the separation line, potentially resulting in improved classification accuracy.

Figure 18:
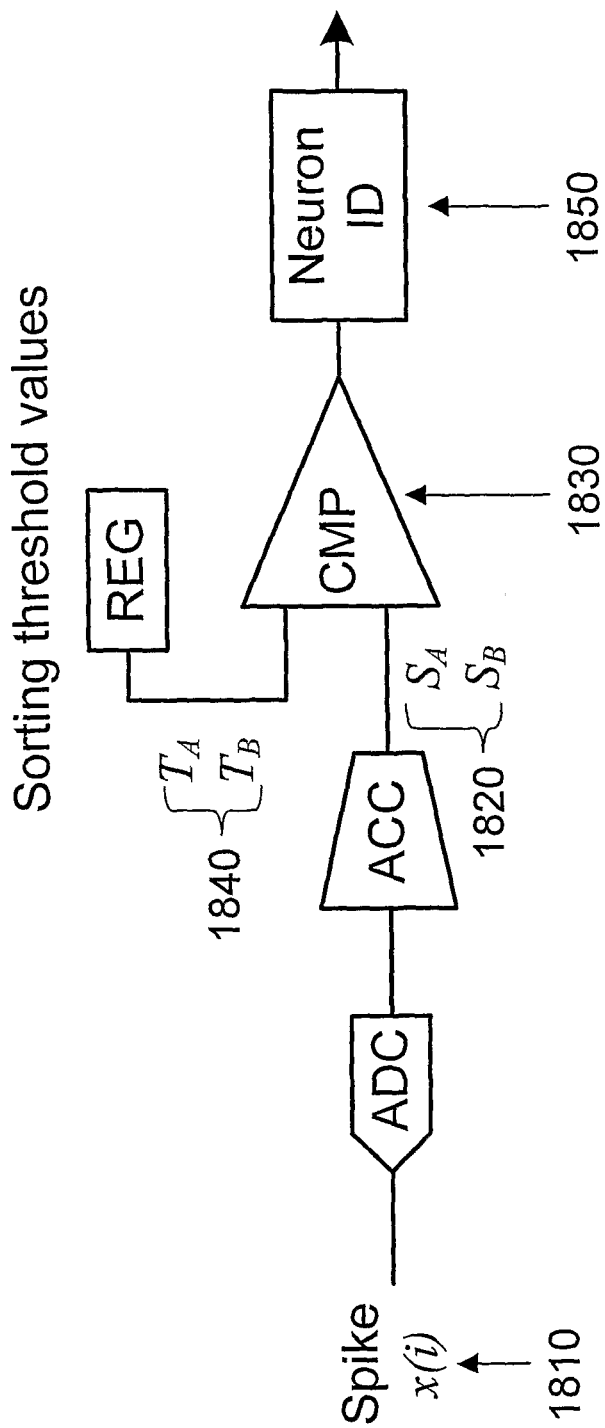
FIG. 18 is a schematic diagram of the VLSI architecture for the SD sorting algorithm, constructed in accordance with the principles of the present invention.

FIG. 18 is a schematic diagram of the VLSI architecture for the SD algorithm, constructed in accordance with the principles of the present invention. The input 1810 is integrated within each time interval (A, B). The two integrals $S_A$ and $S_B$ 1820 are compared 1830 with the predefined threshold values $T_A$ and $T_B$ 1840. If the two integrals fall within the expected ranges, the Neuroprocessor issues a "spike notification message" 1850 to the host computer.

Figures 19A, 19B:
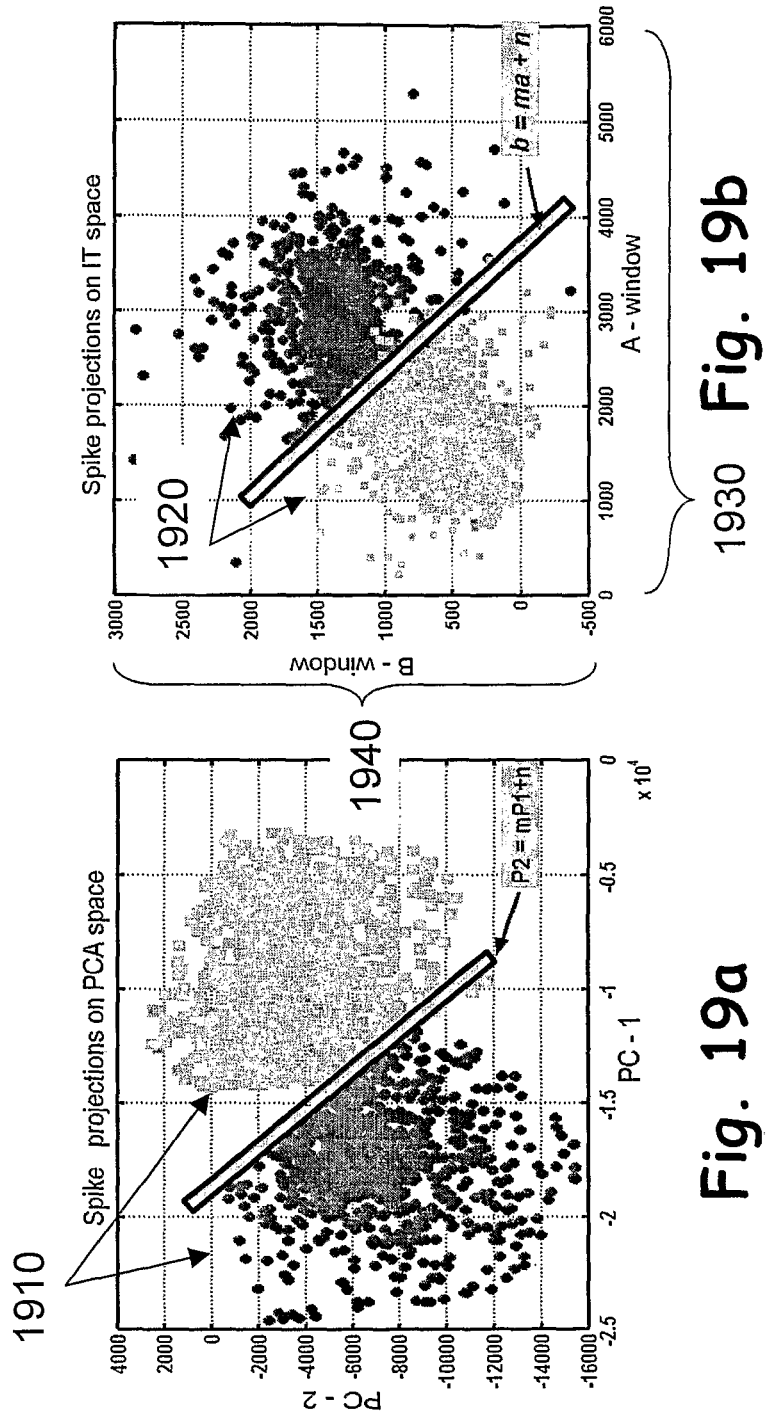
FIG. 19a is a graph of Clustered signals on the Principal Component (PC) space and FIG. 19b is a graph of clustered signals on the Integral Transform (IT) space.

FIG. 19a is a graph of two clusters of signals on the Principal Component (PC) space 1910 and FIG. 19b is a graph of two clusters of signals on the Integral Transform (IT) space 1920. Thus, the SD algorithm may be perceived as operating on an Integral Transform (IT) space instead of the PC space. The two axes represent the normalized values of the signal integrals over A 1930 and B 1940. The integrals of the separation line result in a single point in IT space. Similar to the HD classification, the time-domain comparisons made by the SD algorithm effectively define two recognition quadrants in IT space on opposite sides of the "center point." Such a separation criterion does not obtain reliable results for closely located clusters—many points from both clusters may fall into "unrecognized" quadrants and as a result are unclassified (with reference to FIG. 25 below).

The formal definition of SD is similar to HD, except for the definition of $S_A$, $S_B$, $T_A$ and $T_B$:

$$\{S_A, S_B\} = \left\{\frac{1}{N_A}\sum_{i\in A}x(i),\ \frac{1}{N_B}\sum_{i\in B}x(i)\right\}$$

$$\{T_A, T_B\} = \left\{\frac{1}{N_A}\sum_{i\in A}M(i),\ \frac{1}{N_B}\sum_{i\in B}M(i)\right\}$$

where $N_A=i_2-i_1+1$, $N_B=i_4-i_3+1$, and $\{M(i)|i=1,\ldots,N\}$ is a given separation line. Classification is performed according to Eq. (5).

The Integral Transform (IT) Algorithm

The Integral Transform (IT) sorting algorithm classifies the spikes projected in the two-dimensional Integral Transform space. The two axes of the IT space represent the normalized signal integrals over the time intervals A and B:

$$I_A = \frac{1}{N_A}\sum_{i=1}^{N_A}x(i),\ N_A = i_2 - i_1$$

$$I_B = \frac{1}{N_B}\sum_{i=1}^{N_B}x(i),\ N_B = i_4 - i_3$$

Where $N_A$ and $N_B$ are the number of samples in A and B, respectively.

Both IT and SD algorithms apply a similar integration step, but whereas the SD algorithm employs time domain discrimination, the IT algorithm uses linear classification in IT space, as follows:

$$\text{Class} = \begin{cases} \text{I}, & \text{if } I_B > m\cdot I_A + n \\ \text{II}, & \text{if } I_B < m\cdot I_A + n \end{cases}$$

Here m and n are the parameters of the separation line (FIG. 19b). They are determined by off-line learning, which may be based on any appropriate technique, such as support vector machine (SVM).

Figure 20B:
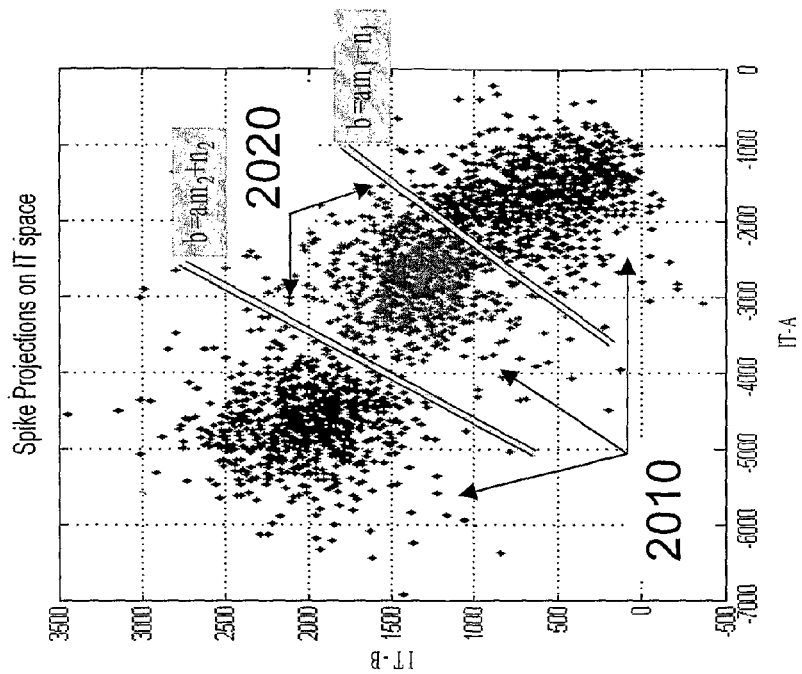
FIGS. 20a and 20b are graphical representations of PC and IT classification, respectively, of three clusters.
Figure 20A:
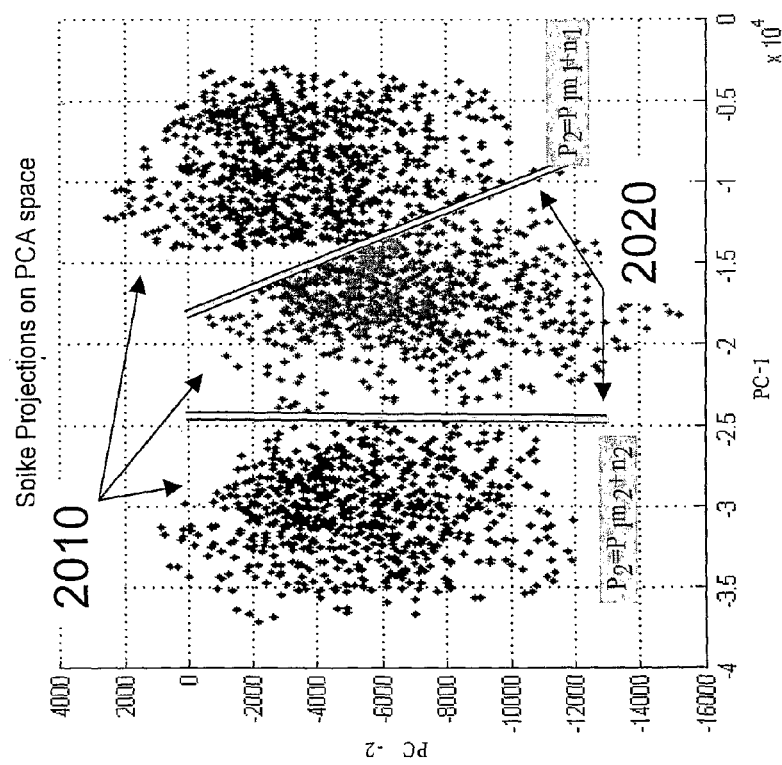

Linear classification has been selected in an attempt to minimize hardware and computational complexities. In simple cases, one line may suffice for sorting spikes into two clusters. FIGS. 20a and 20b are graphical representations of PC and IT classification, respectively, of three clusters. In general, any number of lines may be employed, either to further constrain the classification space, or to enable sorting into three or more clusters, or both. An example of PC and IT classification into three clusters 2010 by two lines 2020 is shown in FIGS. 20a and 20b. Comparing the signal against each line requires one multiplication, one addition and one comparison.

The transformations of a given signal into the PC and IT spaces, as seen in FIGS. 20a and 20b, appear similar. Both transformations apply linear finite impulse response FIR filters, whose step response is either the principal components (for PC) or rectangular (for IT). The integration intervals are ideally positioned at times when signals from different clusters are expected to differ the most, t[0]hus enabling discrimination in IT space. Beginning with FIG. 26 below, it is shown empirically that the IT algorithm can achieve classification to within 2.2% of PCA.

Figure 21:
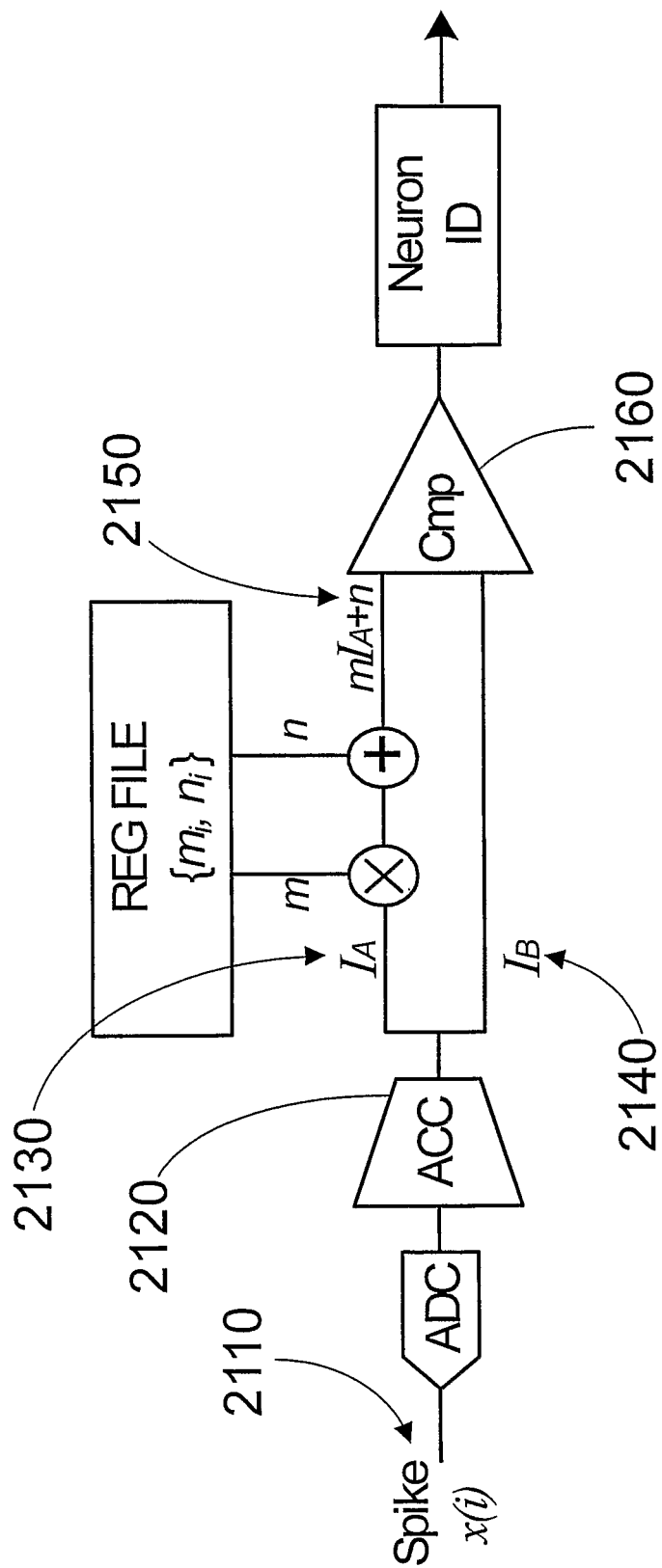
FIG. 21 is a schematic diagram of the VLSI architecture for the IT sorting algorithm, constructed in accordance with the principles of the present invention.

FIG. 21 is a schematic diagram of the VLSI architecture for the IT sorting algorithm, constructed in accordance with the principles of the present invention. The input spike 2110 is integrated 2120 over the first time interval (A) and the result is stored as $I_A$ 2130 (storage is omitted from the figure). During the second interval (B), the integrator generates $I_B$ 2140. Subsequently, for each possible dividing line, the parameters m and n are used to generate the corresponding $mI_A+n$ 2150 value that is compared 2160 with $I_B$ 2140.

Principal Component Sorting

Figure 22:
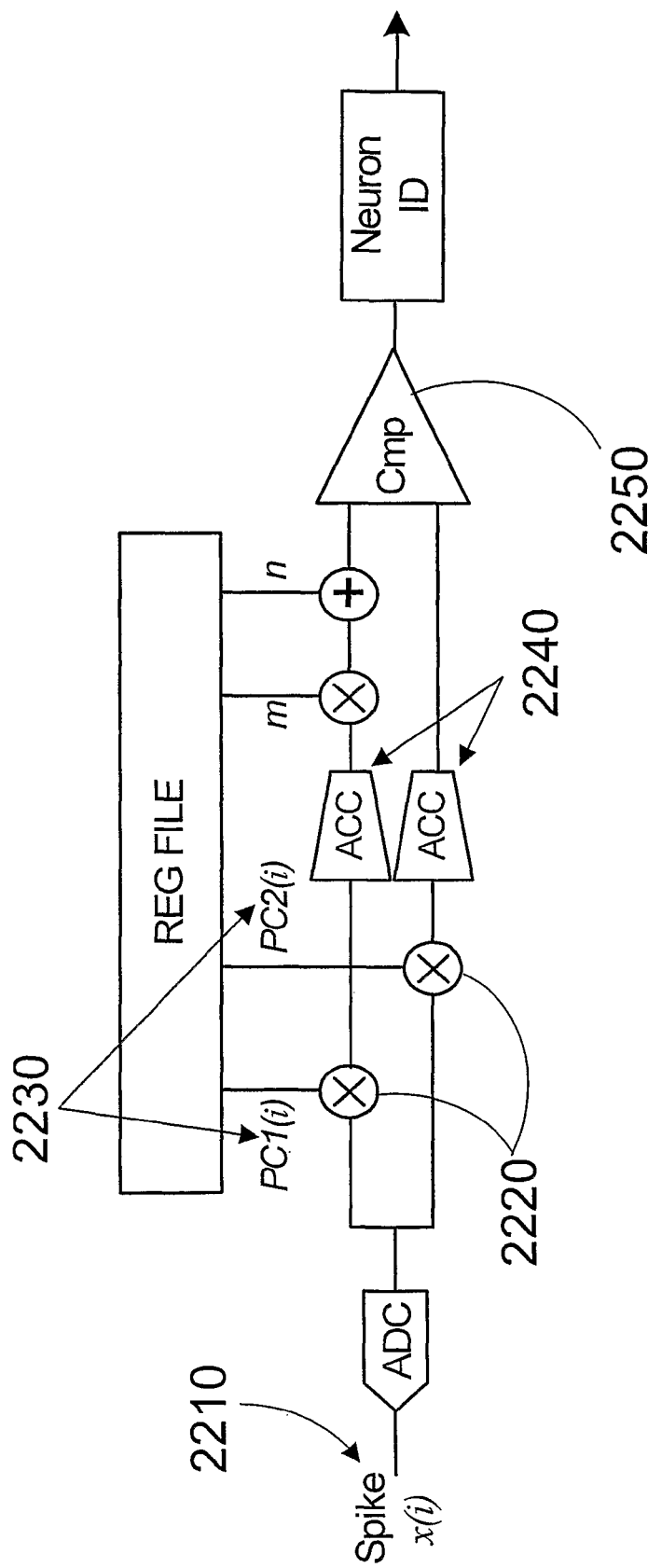
FIG. 22 is a schematic diagram of the VLSI architecture for on-chip sorting by means of principal component analysis (PCA) using two principal components and linear classification, constructed in accordance with the principles of the present invention.

FIG. 22 is a schematic diagram of the VLSI architecture for on-chip sorting by means of principal component analysis (PCA) using two principal components and linear classification, constructed in accordance with the principles of the present invention. Each input sample spike 2210 is multiplied 2220 by two PC coefficients 2230, and the two accumulated 2240 projections are linearly compared 2250, similarly to the IT algorithm.

Segmented PC Sorting

Figure 23:
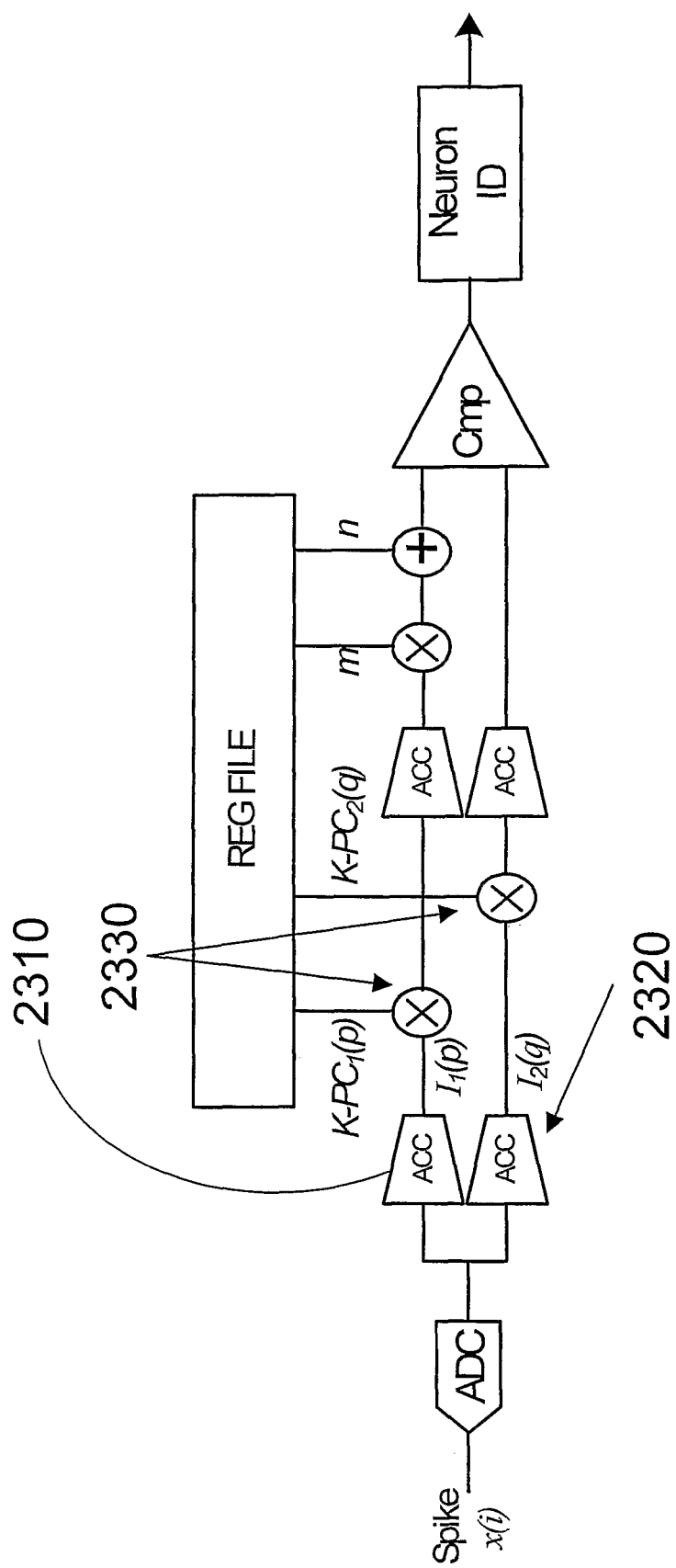
FIG. 23 is a schematic diagram of the VLSI architecture for the K-PC sorting algorithm, constructed in accordance with the principles of the present invention.

FIG. 23 is a schematic diagram of the VLSI architecture for the K-PC sorting algorithm, constructed in accordance with the principles of the present invention. The segmented PC ("K-PC") algorithm approximates PCA by downsampling the principal component vectors, reducing the number of multiplications. The signal is integrated over several time intervals ($k_1$ intervals for $PC_1$ 2310 and $k_2$ intervals for $PC_2$ 2320). Each integral is multiplied 2330 by the average of the principal component values over the same interval, as follows:

$$S_1 = \sum_{p=1}^{k_1} I_1(p) \cdot \alpha(p)$$

where $$I_1(p) = \sum_{i \in interval p} x(i)$$

and $$\alpha(p) = \underset{i \in interval p}{\text{Average}}\{PC_1(i)\}.$$

The expressions for $PC_2$ are similar. Another level of savings in computational complexity can be achieved by approximating the multiplication coefficients $K-PC_{1,2}$ by powers of 2 (and thus the multiplications are achieved by simple bit-shifting).

Results

Algorithm Validation

The hardware spike sorting algorithms described above are compared (by simulation) to a software implementation of PCA. All algorithms are applied to the same data set, comprising a large number of digitized recorded spikes.

Figure 24:
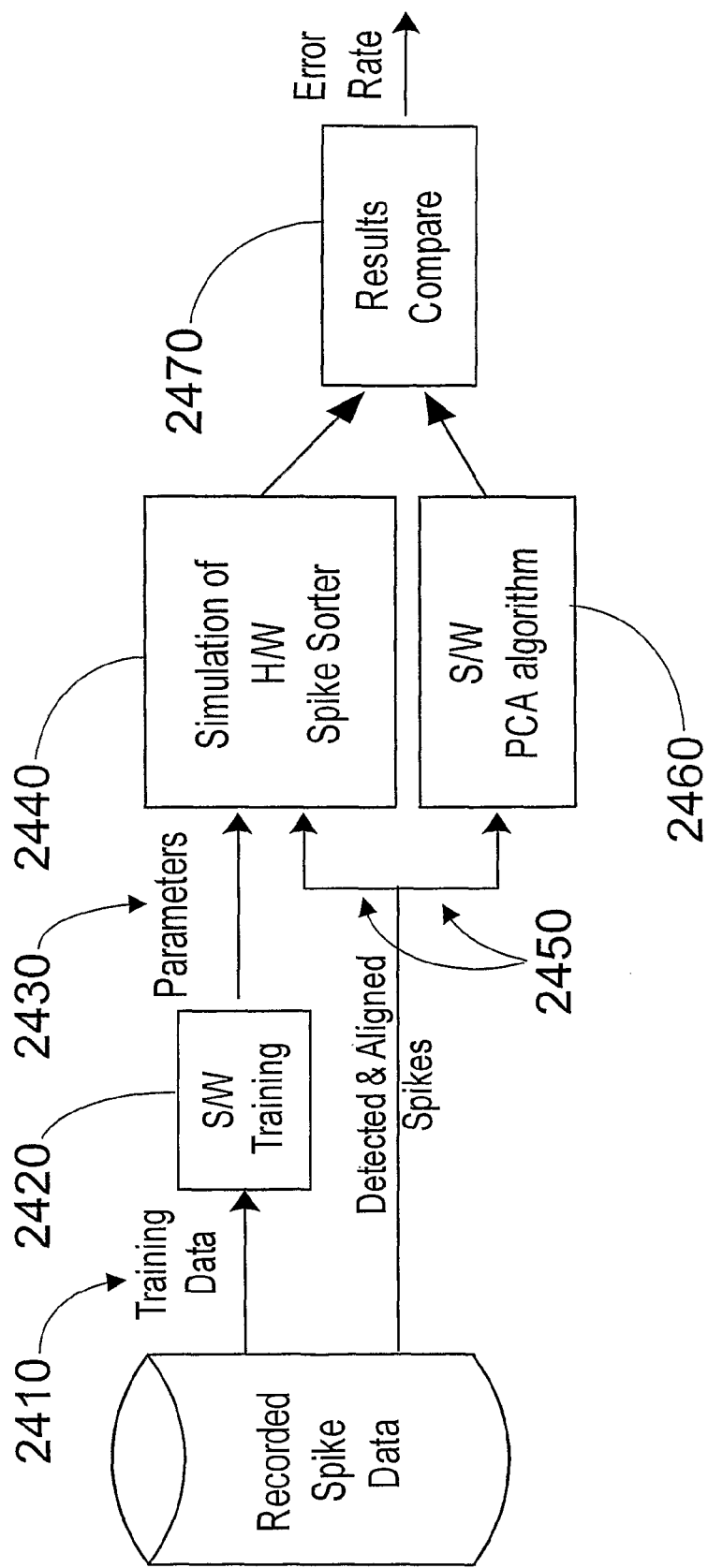
FIG. 24 is a schematic block diagram illustrating the sorting algorithm validation scheme, constructed in accordance with the principles of the present invention.

FIG. 24 is a schematic block diagram illustrating the algorithm validation scheme, constructed in accordance with the principles of the present invention. First, a part of the data 2410 is used for training 2420, producing configuration parameters 2430 for the hardware algorithm. Second, the parameters are downloaded to the Neuroprocessor. Third, a simulation of the Neuroprocessor hardware spike-sorting algorithm 2440 is applied to the entire data set 2450. The software (PCA) algorithm 2460 is also executed on the same data 2450, and the results are compared 2470.

Spike Recording Method

Real spike data was taken from electrophysiological recordings of multiple spike trains, obtained from microelectrodes implanted in various cortical regions. Neuronal signals from the electrodes were amplified, bandpass filtered (300-6000 Hz, four poles Butterworth filter) and sampled at 24 Ksps/electrode. Spike detection was done offline. Only stable spike trains (as judged by stable spike waveforms, stable firing rate and consistent responses to behavioral events) were included in compiled test results. The data set contains about 1000 spikes per cluster.

The hardware algorithms have been applied to this data under a number of simplifying assumptions, ignoring classification errors such as overlapping signals, burst-firing neurons and non-stationary background noise. The test results focuses on the basic problem of hardware-based classification of single neuron spikes contaminated by noise.

Analysis of the Hardware Algorithms

The reduced computational complexity of the proposed VLSI sorting algorithms comes at the expense of precision. Two types of errors emerge when the VLSI algorithms are compared with software PCA sorting: a spike may be unclassified or mis-classified by a hardware algorithm. The two error types are combined into a cumulative error rate, which serves as a figure of merit for the algorithm.

Another measure of the various architectures relates to their computational complexity, which is roughly related to the power consumption. The number of additions and multiplications required are counted for every algorithm to process a single spike. Multiplication is counted as about ten additions. Computational complexity is expressed in the total number of equivalent additions and is roughly related to estimated power consumption of each algorithm.

HD and SD Sorting Algorithms

Classification errors of the HD and SD algorithms range from 10% to 25%, for clusters that are closely located in the PC space (see Table 2 below). Depending on the goals of the experiment, these error rates may or may not be acceptable.

Figure 25:
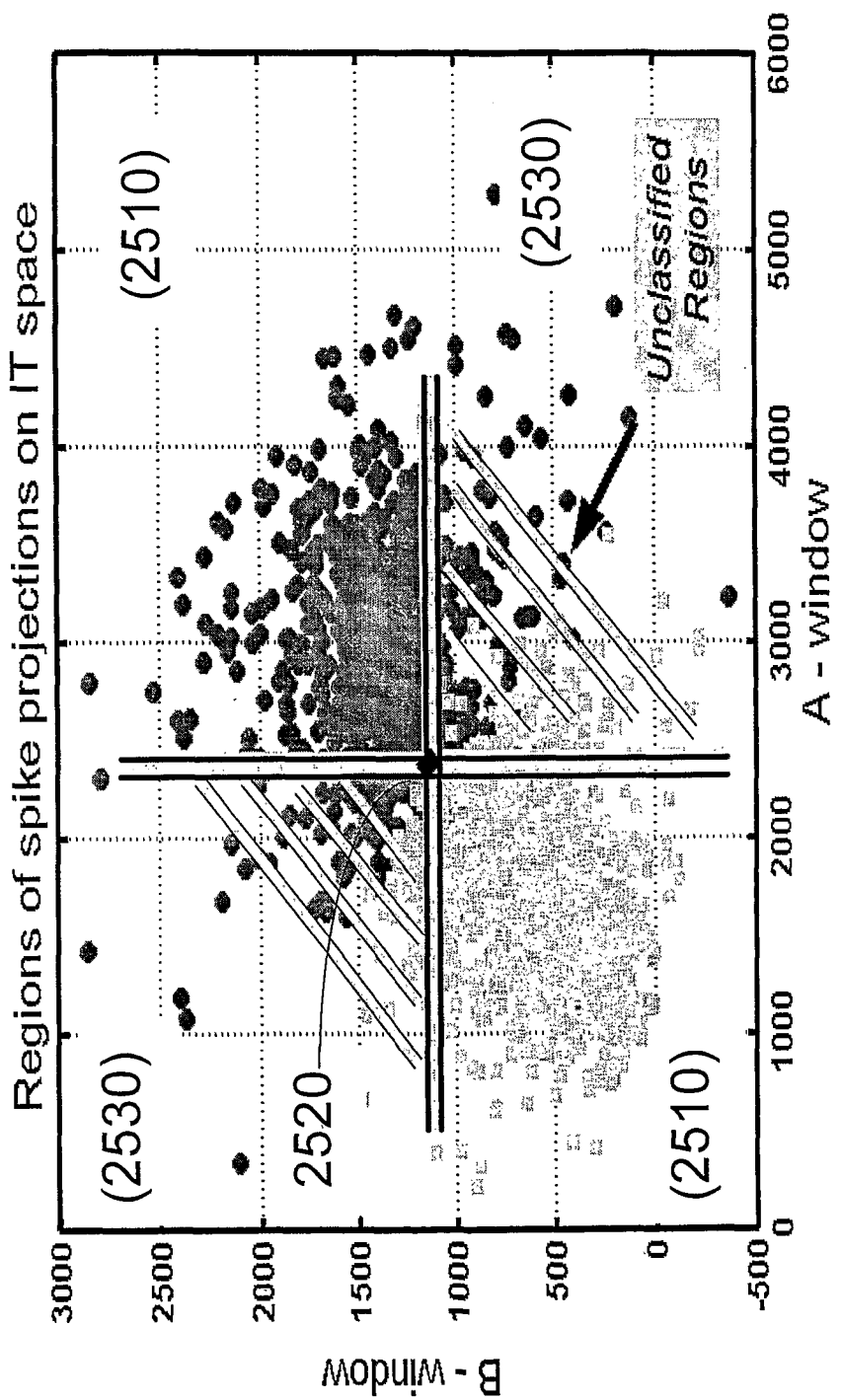
FIG. 25 is a graph of classification regions for HD and SD algorithms.

FIG. 25 is a graph of classification regions for HD and SD algorithms. The low performance of the HD and SD algorithms relates to the fact that they perform time-domain classification. This type of crude classification can be represented as two recognition quadrants 2510 on the opposite sides of the "center point" 2520 in IT space. This separation criterion does not obtain reliable results, especially for closely located clusters. Many spikes from both clusters fall into the adjacent quadrants 2530, and as a result are unclassified.

The IT Algorithm

The IT algorithm was developed to address the high sorting errors of the HD and SD algorithms. The IT algorithm separates the clusters by means of lines (with reference to FIG. 19b above), thus eliminating the unclassified regions. The IT algorithm reduces the error rate to 2.2% (see Table 2 below). It is evident in FIG. 26(b) below, that the IT algorithm incurs the least computational complexity among all low-error, low-complexity solutions.

The Segmented PC Algorithm

Four versions of the segmented PC algorithm have been studied. First, each principal component was simulated for seven and fifteen segments. Second, a simulation was done for a reduced precision version using coefficients that are of the form $2^n$, thus reducing the cost of multiplication to a single addition. The segmented PC algorithms achieve error rates that are somewhat better than IT, at the cost of increased complexity. Note, that the segmented PC algorithms' computational complexity is more than an order of magnitude better than a full PCA.

SUMMARY

The computational complexity and error rates of the various algorithms and architectures are compared in both Table 2 and FIG. 26 below.

Figures 26A, 26B:
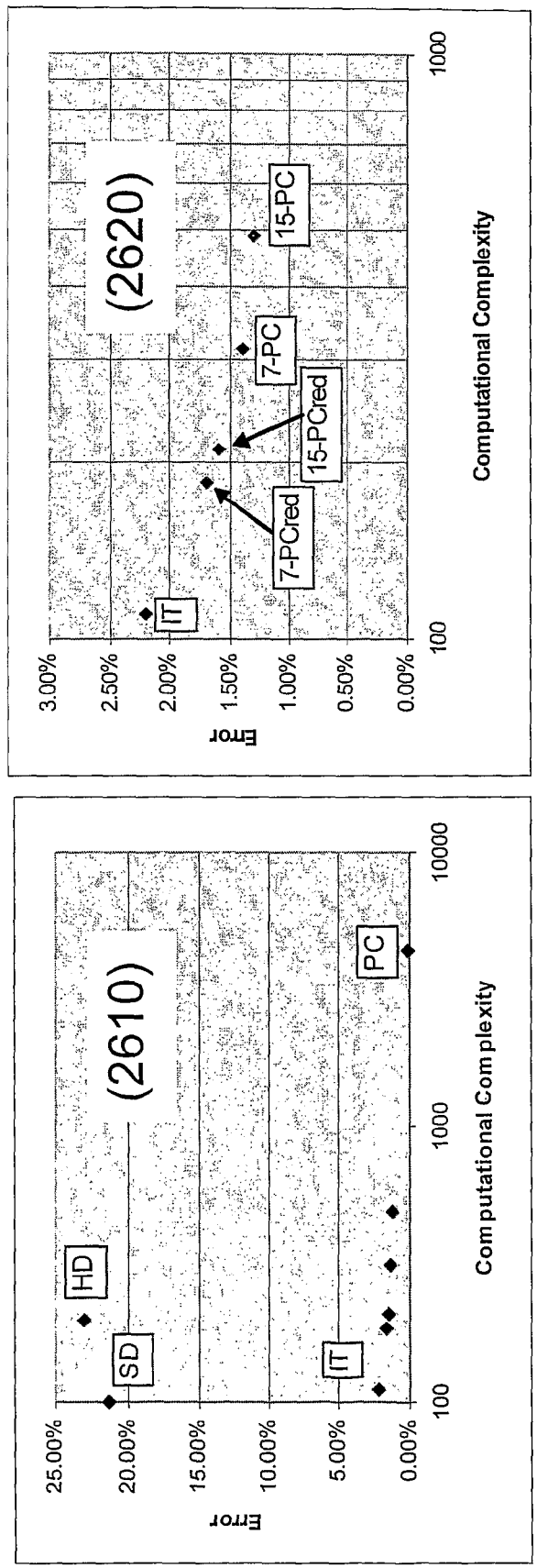
FIG. 26a is a graph of classification error vs. computational complexity.
FIG. 26b is a close-up graph of low-complexity, low-error architectures.

FIG. 26a is a graph of classification error vs. computational complexity 2610. FIG. 26b is a close-up graph of low-complexity, low-error architectures 2620.

Three conclusions are proposed: first, time-domain classification results in high error rates and does not yield a complexity advantage; second, IT classification constitutes the "knee point" of the complexity versus error graph, and is thus suggested as the preferred architecture; and third, segmented PCA-based classification algorithms incur an order of magnitude lower complexity than the full-fledged PCA, yet, they yield only a marginal error performance over IT.

TABLE 2

| Algorithm | Add | Multiply | Computational Compelxity | Unclassified | Misclassified | Error Rate |
|---|---|---|---|---|---|---|
| HD | 200 | | 200 | 20% | 2.7% | 23% |
| SD | 100 | | 100 | 19% | 2.2% | 21% |
| IT | 100 | 1 | 110 | 0.8% | 1.4% | 2.2% |
| 7-PC | 165 | 15 | 315 | 0.4% | 1.0% | 1.4% |
| 15-PC | 190 | 30 | 490 | 0.4% | 0.9% | 1.3% |
| 7-PC red | 175 | 1 | 185 | 0.5% | 1.2% | 1.7% |
| 15-PC red | 200 | 1 | 210 | 0.5% | 1.1% | 1.6% |
| PC | 400 | 400 | 4400 | 0.0% | 0.0% | 0.0% |

CONCLUSIONS

Low-power architectures for spike sorting hardware architectures have been considered. Such systems may be used for implanting near recording electrodes or used in large multi-electrode arrays, either in research or clinical applications. These systems enable substantial reduction of the communication bandwidth, which is essential when a large number of recording electrodes is involved.

The present invention discloses five VLSI architectures for spike sorting: HD compares the signal with pre-computed thresholds. SD integrates the signal in segments and compares the integrals with pre-computed thresholds. IT also integrates the signal in segments, but uses the results for linear classification in a two-dimensional "integral space." PC implements a common PCA analysis with linear classification, and segmented PC applies PCA with a reduced precision.

The algorithms have been simulated with real neuronal spike data. The results are analyzed in terms of classification errors (relative to sorting achieved with software PCA classification). The computational complexity of each algorithm was estimated based on the number of additions and multiplications involved.

The two time-domain classification algorithms, HD and SD, produce high error rates. The segmented PC algorithms incur significantly lower complexity than full PCA. The segmented PC algorithms yield only a marginal error performance over IT, while requiring higher complexity. The IT algorithm turns out to constitute the "knee point" of the complexity versus error graph, and is thus suggested as the preferred architecture.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

REFERENCES

Lewicki M. S., "A review of methods for spike sorting: the detection and classification of neural action potentials." *Network: Comp. Neural Syst.* 9(4): 53-78, 1998.

Schmidt E. "Computer separation of multi-unit neuroelectric data: A review". *J Neurosc Meth.*, 12:95-11. 1984.

Harrison R., "A low-power integrated circuit for adaptive detection of action potentials in noisy signals," *Proc. Inl. Conf IEEE EMBS*, 17-21, 2003.

Y. Perelman and R. Ginosar, "An Integrated System for Multichannel Neuronal Recording with Spike/LFP Separation and Digital Output," 2nd Int. IEEE EMBS Conf. Neural Eng., 377-380, 2005.

A. Zviagintsev, Y. Perelman and R. Ginosar, "A Low-Power Spike Detection and Alignment Algorithm," 2nd Int. IEEE EMBS Conf. Neural Eng., 317-320, 2005.

A. Zviagintsev, Y. Perelman and R. Ginosar, "Low-Power Architectures for Spike Sorting," 2nd Int. IEEE EMBS Conf. Neural Eng., 162-165, 2005.

Wheeler B. C., Nicolelis M. A., "Automatic discrimination of single units," in *Methods for Neural Ensemble Recordings*, Ed. Boca Raton, Fla.: CRC Press LLC, 1999.

Moxon K., Morizio J., Chapin J., Nicolelis M., Wolf P. "Designing a brain-machine interface for neuroprosthetic control," in *Neural Prostheses for Restoration of Sensory and Motor Function*, J. K. Chapin and K. A. Moxon, Eds. Boca Raton, Fla.: CRC Press, 2001.

Obeid I., Wolf P., "Evaluation of Spike-Detection Algorithms for a Brain-Machine Interface Application", *IEEE Trans. Biomed. Eng.*, 51:905-911, 2004

Guillory K. S. and Normann R. A., "A 100-channel system for real time detection and storage of extracellular spike waveforms," *J. Neurosci. Meth.*, 91:21-29, 1999.

H. Nakatani, T. Watanabe, and N. Hoshiyama, Detection of nerve action potentials under low signal-to-noise ratio condition, IEEE Trans. Biomed. Eng., 48:845-849, 2001.

K. Oweiss and D. J. Anderson, "A multiresolution generalized maximum—likelihood approach for the detection of unknown transient multichannel signals in colored noise with unknown covariance," in *Proc. ICASSP*, 2993-2996, 2002.

Kim K. H. and Kim S. J., "A Wavelet-Based Method for Action Potential Detection From Extracellular Neural Signal Recording With Low Signal-to-Noise Ratio," *IEEE Tans. Biomed. Eng.*, 50:999-1011, 2003.

Chandra R., Optican L., "Detection, classification, and superposition resolution of action potentials in multiunit single channel recordings by an on-line real-time neural network," *IEEE Trans. Biomed. Eng.*, 44: 403-412, 1997.

Nicolelis M., "Actions from thoughts," Nature, 409:403-407, 2001.

Zumsteg Z., Ahmed R., Santhanam G., Shenoy K., Meng T., "Power Feasibility of Implantable Digital Spike-Sorting Circuits for Neural Prosthetic Systems," *Proc. 26th Ann. Int. Conf. IEEE EMBS*, 4237-4240, 2004.

Mead C., "Analog VLSI and Neural Systems," Addison-Wesley, 1989.

Alpha Omega Engineering Ltd., Multi-Spike Detector (MSD).

Abeles M, Goldstein M H J., "Multispike train analysis," *IEEE Trans. Biomed. Eng.,* 65:762-73, 1977.

Alpha-Omega Engineering Co., Ltd, Alpha Sort Ref. Manual, 1996-2002.

Eytan D., Brenner N. and Marom S., "Selective Adaptation in Networks of Cortical Neurons," *J. Neurosci. Methods.* 23(28):9349-9356, 2003

Chang, C. C. and C. J. Lin (2001). LIBSVM: a library for support vector machines.

Gesteland R. C., Howland B., Lettvin J. Y., and Pitts W. H., "Comments on microelectrodes," *Proc. IRE,* vol. 47, pp. 1856-1862, 1959.

Worgotter F., Daunicht W. J. and Eckmiller R., "An on-line spike form discriminator for extracellular recordings based on an analog correlation technique," *J. Neurosci. Methods,* 17:141-151, 1986.

Fee M. S., Mitra P. P. and Kleinfeld D., "Automatic sorting of multiple-unit neuronal signals in the presence of anisotropic and non-gaussian variability," *J. Neurosci. Methods,* 69: 175-188, 1996.

D'Hollander E. H. and Orban G., "A Spike recognition and on-line classification by an unsupervised learning system," *IEEE Trans. Biomed. Eng.* 26: 279-84, 1979.

Jansen R. F., "The reconstruction of individual spike trains from extracellular multineuron recording using a neural network emulation program," *J. Neurosci. Methods,* 35: 203-213, 1990.

Plexon Inc. http://www.plexoninc.com/ofs.htm. Dallas, Tex., 2003.

Shahaf G. and Marom S., "Learning in networks of cortical neurons," *J. Neurosci. Methods,* 21(22): 8782-8788, 2001.

Mussa-Ivaldi F. A. and Miller L. E., "Brain-machine interfaces: computational demands and clinical needs meet basic neuroscience," *Trends Neurosc.,* 26: 6, 329-334, 2003.

Bar-Gad I., Ritov Y., Vaadia E., and Bergman H., "Failure in identification of multiple neuron activity causes artificial correlations," *J. Neurosci. Methods.,* 107: 1-13, 2001.

Kim K. H. and Kim S. J., "Neural spike sorting under nearly 0 dB signal-to-noise ratio using nonlinear energy operator and artificial neural network classifier," *IEEE Trans. Biomed. Eng.* 47:1406-1411, 2000.

Lu S. N., Ekstrom A., Isham E., Fried I., Steinmetz P. N., "A Comparison of Unsupervised Automatic and Manual Cluster Analysis for Classifying Human Single Unit Data," *Society for Neuroscience Meeting,* 2003.

Sahani M. M., "Variable models for neural data analysis," Ph.D. dissertation, California Inst. Technol., Pasadena, Calif., 1999.

Zouridakis G. and Tam D. C., "Identification of reliable spike templates in multi-unit extracellular recordings using fuzzy clustering," *Comp. Meth. Prog. Biomed.* 61: 91-98, 2000.

Vapnik V. N., *Statistical learning Theory*, NY John Wiley & Sons, 1998.

We claim:

1. A very-large-scale integration (VLSI) integrated circuit comprising:
    an analog-to-digital converter (ADC) configured to receive an analog input signal from a plurality of electrodes implanted in a brain and to convert the analog input signal to a digital signal;
    a storage of neuronal spike threshold values; and
    circuitry to:
        (a) extract neuronal spikes from the digital signal based on the stored neuronal spike threshold values,
        (b) for each of the extracted neuronal spikes:
            (i) compute integrals of multiple offset values of a negative phase of the neuronal spike,
            (ii) align the neuronal spike at one of the multiple offset values which yields a maximal absolute value of the integral of the negative phase of the neuronal signal,
            (iii) compute an integral of a positive phase of the neuronal signal,
            (iv) output the integral of the negative phase of the neuronal signal and the integral of the positive phase of the neuronal signal,
        (c) sort the extracted neuronal spikes based on the output, and
        (d) transmit the sorted, extracted neuronal spikes to a host computer that is external to the VLSI integrated circuit.

2. The VLSI integrated circuit according to claim 1, further comprising a first-in first-out (FIFO) register positioned to delay the computation of the integral of the positive phase of the neuronal signal until the neuronal spike is aligned.

3. The VLSI integrated circuit according to claim 1, wherein the computation of the integral of the negative phase of the neuronal signal comprises applying a moving average filter.

4. The VLSI integrated circuit according to claim 1, wherein the sorting of the extracted neuronal spikes comprises linearly classifying the extracted neuronal spikes in the integral transform space.

5. The VLSI integrated circuit according to claim 4, wherein the classifying is in accordance with:

$$\text{Class} = \begin{cases} 1, & \text{if } I_B > m \cdot I_A + n \\ 2, & \text{if } I_B < m \cdot I_A + n \end{cases}$$

wherein:
  $I_B$ is the integral of the positive phase of the neuronal signal,
  $I_A$ is the integral of the negative phase of the neuronal signal, and
  m and n are parameters of a separation line (b=ma+n) between classes 1 and 2.

6. The VLSI integrated circuit according to claim 5, wherein m and n are the result of machine learning by a support vector machine (SVM).

7. A method comprising operating a very-large-scale integration (VLSI) integrated circuit to:
    receive an analog input signal from a plurality of electrodes implanted in a brain;
    convert the analog input signal to a digital signal;
    extract neuronal spikes from the digital signal based on stored neuronal spike threshold values;
    for each of the extracted neuronal spikes:
        (i) compute integrals of multiple offset values of a negative phase of the neuronal spike,
        (ii) align the neuronal spike at one of the multiple offset values which yields a maximal absolute value of the integral of the negative phase of the neuronal signal,
        (iii) compute an integral of a positive phase of the neuronal signal, and
        (iv) output the integral of the negative phase of the neuronal signal and the integral of the positive phase of the neuronal signal;

sort the extracted neuronal spikes based on the output; and
transmit the sorted, extracted neuronal spikes to a host computer that is external to the VLSI integrated circuit.

8. The method according to claim 7, further comprising operating a first-in first-out (FIFO) register of the VLSI integrated circuit, to delay the computation of the integral of the positive phase of the neuronal signal until the neuronal spike is aligned.

9. The method according to claim 7, wherein the computation of the integral of the negative phase of the neuronal signal comprises applying a moving average filter.

10. The method according to claim 7, wherein the sorting of the extracted neuronal spikes comprises linearly classifying the extracted neuronal spikes in the integral transform space.

11. The method according to claim 10, wherein the classifying is in accordance with:

$$\text{Class} = \begin{cases} 1, & \text{if } I_B > m \cdot I_A + n \\ 2, & \text{if } I_B < m \cdot I_A + n \end{cases}$$

wherein:
- $I_B$ is the integral of the positive phase of the neuronal signal,
- $I_A$ is the integral of the negative phase of the neuronal signal, and
- m and n are parameters of a separation line (b=ma+n) between classes 1 and 2.

12. The method according to claim 11, wherein m and n are the result of machine learning by a support vector machine (SVM).

\* \* \* \* \*

UNITED STATES PATENT AND TRADEMARK OFFICE
CERTIFICATE OF CORRECTION

PATENT NO.        : 9,449,225 B2
APPLICATION NO.   : 11/571611
DATED             : September 20, 2016
INVENTOR(S)       : Ran Ginosar et al.

It is certified that error appears in the above-identified patent and that said Letters Patent is hereby corrected as shown below:

On the Title Page

(73) Assignee: change "Technion Research & Development Authority, Haifa (IL)" to -- Technion Research and Development Foundation Ltd., Haifa (IL) --.

Signed and Sealed this
Sixteenth Day of May, 2017

Michelle K. Lee
*Director of the United States Patent and Trademark Office*